United States Patent
Liu et al.

(10) Patent No.: US 12,167,453 B2
(45) Date of Patent: Dec. 10, 2024

(54) TECHNIQUES FOR LISTEN-BEFORE-TALK FAILURE REPORTING FOR MULTIPLE TRANSMISSION TIME INTERVALS

(71) Applicant: QUALCOMM Incorporated, San Diego, CA (US)

(72) Inventors: Chih-Hao Liu, San Diego, CA (US); Jing Sun, San Diego, CA (US); Yisheng Xue, San Diego, CA (US); Xiaoxia Zhang, San Diego, CA (US); Sony Akkarakaran, Poway, CA (US); Tao Luo, San Diego, CA (US); Juan Montojo, San Diego, CA (US); Peter Gaal, San Diego, CA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 130 days.

(21) Appl. No.: 17/379,697

(22) Filed: Jul. 19, 2021

(65) Prior Publication Data

US 2023/0015997 A1 Jan. 19, 2023

(51) Int. Cl.
*H04W 74/0816* (2024.01)
*H04L 1/1867* (2023.01)
(Continued)

(52) U.S. Cl.
CPC ....... *H04W 74/0816* (2013.01); *H04L 1/1896* (2013.01); *H04W 72/0446* (2013.01);
(Continued)

(58) Field of Classification Search
CPC ......... H04W 74/0816; H04W 72/0446; H04W 72/23; H04W 74/006; H04W 92/18;
(Continued)

(56) References Cited

U.S. PATENT DOCUMENTS

| 11,677,512 B2 * | 6/2023 | Ye | H04W 72/20 |
| | | | 370/329 |
| 2009/0213815 A1 * | 8/2009 | Sherman | H04W 74/0841 |
| | | | 370/336 |

(Continued)

FOREIGN PATENT DOCUMENTS

WO    WO2020069114 A1 *  4/2020  ............ H04W 74/08

*Primary Examiner* — Chirag G Shah
*Assistant Examiner* — Joshua Smith
(74) *Attorney, Agent, or Firm* — Dalei Dong; Holland & Hart LLP

(57) ABSTRACT

Techniques for wireless communications are described. A user equipment (UE) may receive downlink control information (DCI) scheduling sidelink transmissions in one or more sets of multiple transmission time intervals (TTIs) over a shared spectrum. The UE may perform a listen-before-talk (LBT) for one or more of the TTIs in the one or more sets of multiple TTIs, and the UE may transmit, to a base station, an indication of results of the LBT performed for the one or more TTIs. Because the UE may provide the results of the LBT to the base station, the base station may be able to schedule sidelink transmissions from the UE based on the results of the LBT. As such, the UE may experience increased throughput in sidelink communications since the scheduling at the base station may be improved.

23 Claims, 17 Drawing Sheets

(51) Int. Cl.
*H04W 72/0446* (2023.01)
*H04W 72/23* (2023.01)
*H04W 74/00* (2009.01)
*H04W 92/18* (2009.01)

(52) U.S. Cl.
CPC ......... *H04W 72/23* (2023.01); *H04W 74/006* (2013.01); *H04W 92/18* (2013.01)

(58) Field of Classification Search
CPC . H04W 88/04; H04W 74/0808; H04W 72/40; H04L 1/1896; H04L 1/1671; H04L 1/1854; H04L 1/1861; H04L 5/0055
See application file for complete search history.

(56) References Cited

U.S. PATENT DOCUMENTS

| | | | | |
|---|---|---|---|---|
| 2016/0270100 A1* | 9/2016 | Ng | ................ | H04L 5/008 |
| 2016/0338053 A1* | 11/2016 | Park | ................ | H04W 74/0808 |
| 2017/0332358 A1* | 11/2017 | Park | ................ | H04W 74/0816 |
| 2018/0124612 A1* | 5/2018 | Babaei | ................ | H04W 72/23 |
| 2019/0109677 A1* | 4/2019 | Wang | ................ | H04W 72/23 |
| 2020/0029318 A1* | 1/2020 | Guo | ................ | H04W 74/0833 |
| 2020/0221495 A1* | 7/2020 | Chen | ................ | H04W 74/0808 |
| 2021/0144762 A1* | 5/2021 | Tsai | ................ | H04W 74/0808 |
| 2021/0306984 A1* | 9/2021 | Lee | ................ | H04W 72/02 |
| 2021/0400704 A1* | 12/2021 | Xue | ................ | H04W 74/0816 |
| 2022/0150949 A1* | 5/2022 | Sun | ................ | H04W 74/0808 |
| 2022/0150960 A1* | 5/2022 | Sun | ................ | H04W 74/0808 |
| 2023/0171793 A1* | 6/2023 | Kim | ................ | H04W 72/40 370/329 |
| 2023/0198708 A1* | 6/2023 | Hong | ................ | H04W 4/40 370/329 |
| 2023/0199824 A1* | 6/2023 | Lee | ................ | H04W 72/25 370/329 |
| 2023/0199875 A1* | 6/2023 | Back | ................ | H04W 76/14 370/329 |
| 2023/0209476 A1* | 6/2023 | Kim | ................ | H04W 52/36 370/311 |
| 2023/0269769 A1* | 8/2023 | Ganesan | ................ | H04W 74/0808 370/328 |
| 2023/0328807 A1* | 10/2023 | Wu | ................ | H04W 76/19 370/329 |
| 2023/0396385 A1* | 12/2023 | Kwak | ................ | H04W 72/232 |
| 2024/0089982 A1* | 3/2024 | Lee | ................ | H04W 72/25 |

* cited by examiner

TECHNIQUES FOR LISTEN-BEFORE-TALK FAILURE REPORTING FOR MULTIPLE TRANSMISSION TIME INTERVALS

FIELD OF TECHNOLOGY

The following relates to wireless communications, including techniques for listen-before-talk failure reporting for multiple transmission time intervals.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems may support sidelink communications between UEs over a shared radio frequency spectrum. In such systems, a UE may contend for access to the shared radio frequency spectrum to transmit sidelink data to another UE. For instance, the UE may perform a listen-before-talk (LBT) procedure to gain access to the shared radio frequency spectrum to transmit the sidelink data. Improved techniques for reporting results of an LBT performed on a shared radio frequency spectrum may be desirable.

SUMMARY

The present disclosure relates to improved methods, systems, devices, and apparatuses that support techniques for listen-before-talk (LBT) failure reporting for multiple transmission time intervals (TTIs). A user equipment (UE) may receive downlink control information (DCI) scheduling sidelink transmissions in one or more sets of multiple TTIs over a shared spectrum. The UE may perform LBT for one or more of the TTIs in the one or more sets of multiple TTIs, and the UE may transmit, to a base station, an indication of results of the LBT performed for the one or more TTIs. Because the UE may provide the results of the LBT to the base station, the base station may be able to schedule subsequent sidelink transmissions from the UE based on the results of the LBT. For instance, the base station may schedule the UE for sidelink communications on a different band if the results of the LBT indicate that the UE has been unable to gain access to a previous band. As such, the UE may experience increased throughput in sidelink communications since the scheduling at the base station may be improved.

A method for wireless communication at a first UE is described. The method may include receiving, from a base station, downlink control information scheduling sidelink transmissions, from the first UE to a second UE, in one or more sets of multiple transmission time intervals over a shared radio frequency spectrum, performing listen-before-talk for one or more transmission time intervals in the one or more sets of multiple transmission time intervals, and transmitting, to the base station in an uplink control channel allocated for acknowledgment or negative acknowledgment feedback for the sidelink transmissions, an indication of results of the listen-before-talk performed for the one or more transmission time intervals.

An apparatus for wireless communication at a first UE is described. The apparatus may include a processor, memory coupled with the processor, and instructions stored in the memory. The instructions may be executable by the processor to cause the apparatus to receive, from a base station, downlink control information scheduling sidelink transmissions, from the first UE to a second UE, in one or more sets of multiple transmission time intervals over a shared radio frequency spectrum, perform listen-before-talk for one or more transmission time intervals in the one or more sets of multiple transmission time intervals, and transmit, to the base station in an uplink control channel allocated for acknowledgment or negative acknowledgment feedback for the sidelink transmissions, an indication of results of the listen-before-talk performed for the one or more transmission time intervals.

Another apparatus for wireless communication at a first UE is described. The apparatus may include means for receiving, from a base station, downlink control information scheduling sidelink transmissions, from the first UE to a second UE, in one or more sets of multiple transmission time intervals over a shared radio frequency spectrum, means for performing listen-before-talk for one or more transmission time intervals in the one or more sets of multiple transmission time intervals, and means for transmitting, to the base station in an uplink control channel allocated for acknowledgment or negative acknowledgment feedback for the sidelink transmissions, an indication of results of the listen-before-talk performed for the one or more transmission time intervals.

A non-transitory computer-readable medium storing code for wireless communication at a first UE is described. The code may include instructions executable by a processor to receive, from a base station, downlink control information scheduling sidelink transmissions, from the first UE to a second UE, in one or more sets of multiple transmission time intervals over a shared radio frequency spectrum, perform listen-before-talk for one or more transmission time intervals in the one or more sets of multiple transmission time intervals, and transmit, to the base station in an uplink control channel allocated for acknowledgment or negative acknowledgment feedback for the sidelink transmissions, an indication of results of the listen-before-talk performed for the one or more transmission time intervals.

In some examples of the method, apparatuses, and non-transitory computer-readable medium described herein, the transmitting may include operations, features, means, or instructions for transmitting, for each transmission time interval in the one or more sets, two bits indicating an acknowledgment or negative acknowledgment for the transmission time interval and an outcome of the listen-before-talk for the transmission time interval. In some examples of the method, apparatuses, and non-transitory computer-readable medium described herein, a first bit of the two bits indicates the acknowledgment or the negative acknowledgment, and a second bit of the two bits indicates the outcome of the listen-before-talk.

In some examples of the method, apparatuses, and non-transitory computer-readable medium described herein, the two bits jointly indicate one of three states corresponding to a successful listen-before-talk and an acknowledgment, a successful listen-before-talk and a negative acknowledgment, and an unsuccessful listen-before-talk. In some examples of the method, apparatuses, and non-transitory computer-readable medium described herein, the transmitting may include operations, features, means, or instructions for transmitting, for each set of the one or more sets, an indication of transmission time intervals in the set in which the listen-before-talk may be successful.

In some examples of the method, apparatuses, and non-transitory computer-readable medium described herein, the indication of transmission time intervals in the set in which the listen-before-talk may be successful includes an index of a transmission time interval in the set in which the listen-before-talk may be successful. In some examples of the method, apparatuses, and non-transitory computer-readable medium described herein, the index of the transmission time interval in the set in which the listen-before-talk may be successful may be relative to an index of a first transmission time interval in the set. In some examples of the method, apparatuses, and non-transitory computer-readable medium described herein, a quantity of bits used for the indication of transmission time intervals in the set in which the listen-before-talk may be successful may be based on a number of transmission time intervals in the set.

In some examples of the method, apparatuses, and non-transitory computer-readable medium described herein, the transmitting may include operations, features, means, or instructions for transmitting an indication of a quantity of transmission time intervals in the one or more sets in which the listen-before-talk may be successful. In some examples of the method, apparatuses, and non-transitory computer-readable medium described herein, a quantity of bits used for the indication of the quantity of transmission time intervals in the one or more sets in which the listen-before-talk may be successful may be based on a quantity of transmission time intervals in the one or more sets.

Some examples of the method, apparatuses, and non-transitory computer-readable medium described herein may further include operations, features, means, or instructions for receiving, in the downlink control information, a sidelink assignment indicator indicating an accumulative quantity of transmission time intervals in which the first UE may be scheduled to transmit sidelink transmissions. In some examples of the method, apparatuses, and non-transitory computer-readable medium described herein, a quantity of bits used for the sidelink assignment indicator may be based on a maximum number of transmission time intervals supported by the downlink control information.

Some examples of the method, apparatuses, and non-transitory computer-readable medium described herein may further include operations, features, means, or instructions for detecting that the first UE failed to receive previous downlink control information scheduling previous sidelink transmissions from the first UE based on the sidelink assignment indicator and transmitting, in the uplink control channel, a negative acknowledgment and an indication of an unsuccessful listen-before-talk for each of the previous sidelink transmissions based on the detecting. Some examples of the method, apparatuses, and non-transitory computer-readable medium described herein may further include operations, features, means, or instructions for receiving, in the downlink control information in addition to the sidelink assignment indicator, a listen-before-talk sidelink assignment indicator indicating an accumulative quantity of listen-before-talk outcome bits to be transmitted by the first UE to the base station.

Some examples of the method, apparatuses, and non-transitory computer-readable medium described herein may further include operations, features, means, or instructions for detecting that the first UE failed to receive previous downlink control information scheduling previous sidelink transmissions from the first UE based on the sidelink assignment indicator and that the first UE failed to transmit listen-before-talk outcome bits for the previous sidelink transmissions based on the listen-before-talk sidelink assignment indicator and transmitting, in the uplink control channel, a negative acknowledgment for each of the previous sidelink transmissions and listen-before-talk outcome bits set to one for the previous sidelink transmissions indicating an unsuccessful listen-before-talk for each of the previous sidelink transmissions based on the detecting.

Some examples of the method, apparatuses, and non-transitory computer-readable medium described herein may further include operations, features, means, or instructions for receiving, in the downlink control information, a sidelink assignment indicator indicating a first accumulative quantity of transmission time intervals in which the first UE may be scheduled to transmit sidelink transmissions plus a second accumulative quantity of listen-before-talk outcome bits to be transmitted by the first UE to the base station.

Some examples of the method, apparatuses, and non-transitory computer-readable medium described herein may further include operations, features, means, or instructions for detecting that the first UE failed to receive previous downlink control information scheduling previous sidelink transmissions from the first UE and failed to transmit listen-before-talk outcome bits for the previous sidelink transmissions based on the sidelink assignment indicator and transmitting, in the uplink control channel, a negative acknowledgment for each of the previous sidelink transmissions and listen-before-talk outcome bits set to one for the previous sidelink transmissions indicating an unsuccessful listen-before-talk for each of the previous sidelink transmissions based on the detecting.

A method for wireless communication at a base station is described. The method may include transmitting, to a first UE, downlink control information scheduling sidelink transmissions, from the first UE to a second UE, in one or more sets of multiple transmission time intervals over a shared radio frequency spectrum, receiving, from the first UE in an uplink control channel allocated for acknowledgment or negative acknowledgment feedback for the sidelink transmissions, an indication of results of listen-before-talk performed by the first UE for one or more transmission time intervals in the one or more sets of multiple transmission time intervals, and scheduling subsequent sidelink transmissions from the first UE based on the results of the listen-before-talk.

An apparatus for wireless communication at a base station is described. The apparatus may include a processor, memory coupled with the processor, and instructions stored in the memory. The instructions may be executable by the processor to cause the apparatus to transmit, to a first UE, downlink control information scheduling sidelink transmissions, from the first UE to a second UE, in one or more sets of multiple transmission time intervals over a shared radio frequency spectrum, receive, from the first UE in an uplink control channel allocated for acknowledgment or negative acknowledgment feedback for the sidelink transmissions, an indication of results of listen-before-talk performed by the first UE for one or more transmission time intervals in the one or more sets of multiple transmission time intervals, and schedule subsequent sidelink transmissions from the first UE based on the results of the listen-before-talk.

Another apparatus for wireless communication at a base station is described. The apparatus may include means for transmitting, to a first UE, downlink control information scheduling sidelink transmissions, from the first UE to a second UE, in one or more sets of multiple transmission time intervals over a shared radio frequency spectrum, means for receiving, from the first UE in an uplink control channel allocated for acknowledgment or negative acknowledgment feedback for the sidelink transmissions, an indication of results of listen-before-talk performed by the first UE for one or more transmission time intervals in the one or more sets of multiple transmission time intervals, and means for scheduling subsequent sidelink transmissions from the first UE based on the results of the listen-before-talk.

A non-transitory computer-readable medium storing code for wireless communication at a base station is described. The code may include instructions executable by a processor to transmit, to a first UE, downlink control information scheduling sidelink transmissions, from the first UE to a second UE, in one or more sets of multiple transmission time intervals over a shared radio frequency spectrum, receive, from the first UE in an uplink control channel allocated for acknowledgment or negative acknowledgment feedback for the sidelink transmissions, an indication of results of listen-before-talk performed by the first UE for one or more transmission time intervals in the one or more sets of multiple transmission time intervals, and schedule subsequent sidelink transmissions from the first UE based on the results of the listen-before-talk.

In some examples of the method, apparatuses, and non-transitory computer-readable medium described herein, the receiving may include operations, features, means, or instructions for receiving, for each transmission time interval in the one or more sets, two bits indicating an acknowledgment or negative acknowledgment for the transmission time interval and an outcome of the listen-before-talk for the transmission time interval. In some examples of the method, apparatuses, and non-transitory computer-readable medium described herein, a first bit of the two bits indicates the acknowledgment or the negative acknowledgment, and a second bit of the two bits indicates the outcome of the listen-before-talk.

In some examples of the method, apparatuses, and non-transitory computer-readable medium described herein, the two bits jointly indicate one of three states corresponding to a successful listen-before-talk and an acknowledgment, a successful listen-before-talk and a negative acknowledgment, and an unsuccessful listen-before-talk. In some examples of the method, apparatuses, and non-transitory computer-readable medium described herein, the receiving may include operations, features, means, or instructions for receiving, for each set of the one or more sets, an indication of transmission time intervals in the set in which the listen-before-talk may be successful.

In some examples of the method, apparatuses, and non-transitory computer-readable medium described herein, the indication of transmission time intervals in the set in which the listen-before-talk may be successful includes an index of a transmission time interval in the set in which the listen-before-talk may be successful. In some examples of the method, apparatuses, and non-transitory computer-readable medium described herein, the index of the transmission time interval in the set in which the listen-before-talk may be successful may be relative to an index of a first transmission time interval in the set. In some examples of the method, apparatuses, and non-transitory computer-readable medium described herein, a quantity of bits used for the indication of transmission time intervals in the set in which the listen-before-talk may be successful may be based on a number of transmission time intervals in the set.

In some examples of the method, apparatuses, and non-transitory computer-readable medium described herein, the receiving may include operations, features, means, or instructions for receiving an indication of a quantity of transmission time intervals in the one or more sets in which the listen-before-talk may be successful. In some examples of the method, apparatuses, and non-transitory computer-readable medium described herein, a quantity of bits used for the indication of the quantity of transmission time intervals in the one or more sets in which the listen-before-talk may be successful may be based on a quantity of transmission time intervals in the one or more sets.

Some examples of the method, apparatuses, and non-transitory computer-readable medium described herein may further include operations, features, means, or instructions for transmitting, in the downlink control information, a sidelink assignment indicator indicating an accumulative quantity of transmission time intervals in which the first UE may be scheduled to transmit sidelink transmissions. In some examples of the method, apparatuses, and non-transitory computer-readable medium described herein, a quantity of bits used for the sidelink assignment indicator may be based on a maximum number of transmission time intervals supported by the downlink control information.

Some examples of the method, apparatuses, and non-transitory computer-readable medium described herein may further include operations, features, means, or instructions for receiving, in the uplink control channel, a negative acknowledgment and an indication of an unsuccessful listen-before-talk for each sidelink transmission of a set of previous sidelink transmissions scheduled by previous downlink control information from the base station based on the first UE failing to receive the previous downlink control information and based on transmitting the sidelink assignment indicator. Some examples of the method, apparatuses, and non-transitory computer-readable medium described herein may further include operations, features, means, or instructions for transmitting, in the downlink control information in addition to the sidelink assignment indicator, a listen-before-talk sidelink assignment indicator indicating an accumulative quantity of listen-before-talk outcome bits to be transmitted by the first UE to the base station.

Some examples of the method, apparatuses, and non-transitory computer-readable medium described herein may further include operations, features, means, or instructions for receiving, in the uplink control channel, a negative acknowledgment for each sidelink transmission of a set of previous sidelink transmissions scheduled by previous downlink control information from the base station based on the first UE failing to receive the previous downlink control information and based on transmitting the sidelink assignment indicator and receiving, in the uplink control channel, listen-before-talk outcome bits set to one for the previous sidelink transmissions indicating an unsuccessful listen-before-talk for each of the previous sidelink transmissions based on transmitting the listen-before-talk sidelink assignment indicator.

Some examples of the method, apparatuses, and non-transitory computer-readable medium described herein may further include operations, features, means, or instructions for transmitting, in the downlink control information, a sidelink assignment indicator indicating a first accumulative quantity of transmission time intervals in which the first UE may be scheduled to transmit sidelink transmissions plus a second accumulative quantity of listen-before-talk outcome bits to be transmitted by the first UE to the base station.

Some examples of the method, apparatuses, and non-transitory computer-readable medium described herein may further include operations, features, means, or instructions for receiving, in the uplink control channel, a negative acknowledgment for each sidelink transmission of a set of previous sidelink transmissions scheduled by previous downlink control information from the base station based on the first UE failing to receive the previous downlink control information and based on transmitting the sidelink assignment indicator and receiving, in the uplink control channel, listen-before-talk outcome bits set to one for the previous sidelink transmissions indicating an unsuccessful listen-before-talk for each of the previous sidelink transmissions based on transmitting the sidelink assignment indicator.

DETAILED DESCRIPTION

Figure 1:
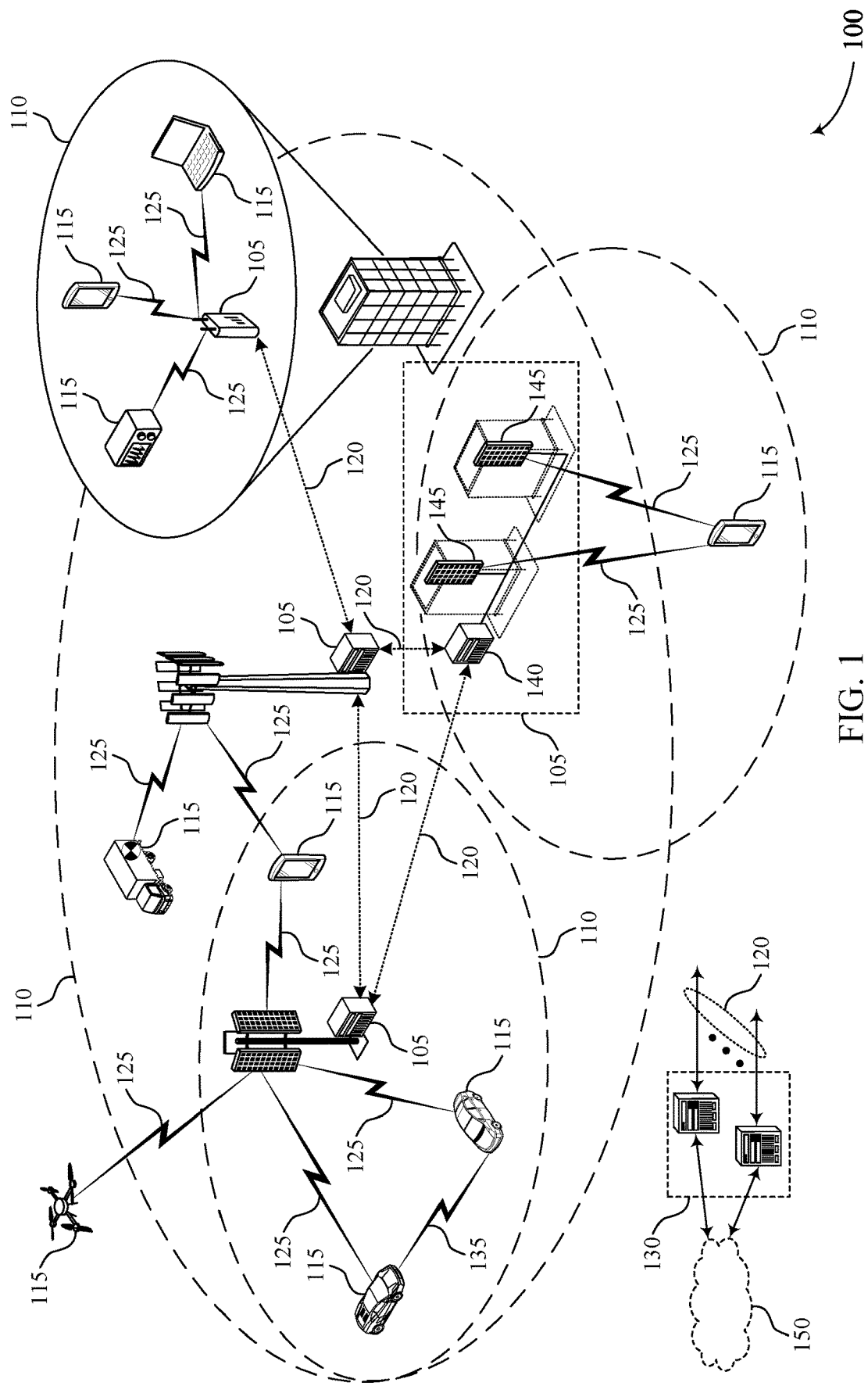
FIG. 1 illustrates an example of a wireless communications system that supports techniques for listen-before-talk (LBT) failure reporting for multiple transmission time intervals (TTIs) in accordance with aspects of the present disclosure.

Some wireless communications systems may support sidelink communications between user equipment (UEs) in a shared radio frequency spectrum. In such systems, a UE may contend for access to the shared radio frequency spectrum to transmit sidelink data to another UE. For instance, a UE may perform a listen-before-talk (LBT) to gain access to the shared radio frequency spectrum for a sidelink transmission to another UE. In some cases, if the LBT performed by the UE fails, and the UE is unable to gain access to the shared radio frequency spectrum for the sidelink transmission, a base station may have to reschedule the sidelink transmission. To minimize the overhead associated with scheduling and rescheduling sidelink communications, a base station may allocate multiple transmission time intervals (TTIs) to a UE for sidelink communications with another UE. That is, the UE may be scheduled for a multi-TTI sidelink transmission.

A wireless communications system supporting multi-TTI sidelink transmissions may experience increased throughput with minimal control (e.g., scheduling) overhead. In some cases, however, although a base station may allocate multiple TTIs to a UE for sidelink communications, the UE may not gain access to the shared radio frequency spectrum for all of the multiple TTIs for the sidelink communications. That is, an LBT performed on one or more of the TTIs may fail. Nevertheless, the UE may report acknowledgment (ACK) and negative acknowledgment (NACK) feedback to a base station for each of the multiple TTIs. For instance, the UE may transmit a NACK for each of the TTIs in which the LBT failed. Because the base station may not be able to differentiate between a NACK corresponding to a failed LBT and a NACK corresponding to a decoding failure, scheduling decisions made by the base station may be flawed or inefficient.

As described herein, a wireless communications system may support efficient techniques for LBT failure reporting for multiple TTIs to improve scheduling for sidelink communications. A UE may receive downlink control information (DCI) scheduling sidelink transmissions in one or more sets of multiple TTIs over a shared spectrum. The UE may perform LBT for one or more of the TTIs in the one or more sets of multiple TTIs, and the UE may transmit, to a base station, an indication of results of the LBT performed for the one or more TTIs. Because the UE may provide the results of the LBT to the base station, the base station may be able to schedule subsequent sidelink transmissions from the UE based on the results of the LBT. For instance, the base station may schedule the UE for sidelink communications on a different band if the results of the LBT indicate that the UE has been unable to gain access to a previous band. As a result, the UE may experience increased throughput in sidelink communications while using minimal overhead to provide the results of the LBT.

Aspects of the disclosure are initially described in the context of wireless communications systems. Examples of processes and signaling exchanges that support techniques for LBT failure reporting for multiple TTIs are then described. Aspects of the disclosure are further illustrated by and described with reference to apparatus diagrams, system diagrams, and flowcharts that relate to techniques for LBT failure reporting for multiple TTIs.

FIG. 1 illustrates an example of a wireless communications system 100 that supports techniques for LBT failure reporting for multiple TTIs in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105 (e.g., in a physical uplink shared channel (PUSCH) or a physical uplink control channel (PUCCH)), or downlink transmissions from a base station 105 to a UE 115 (e.g., in a physical downlink shared channel (PDSCH) or a physical downlink control channel (PDCCH)). Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$, may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both unshared (e.g., licensed) and shared (e.g., unlicensed) radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. For example, the base stations 105 and the UEs 115 may employ LBT procedures to ensure a frequency channel (e.g., an LBT subchannel or a frequency band that is accessible via an LBT procedure) is clear before transmitting data. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

In some implementations, there may be different categories of LBT procedures, including category 1 LBT (e.g., no LBT), category 2 LBT (e.g., LBT including one-time channel sensing for a fixed period without a back-off period), category 3 LBT (e.g., LBT with a random (or other) back-off period and a fixed sized contention window), and category 4 LBT (e.g., LBT with a random (or other) back-off period and a variable sized contention window). In some cases, a category 2 LBT procedure may be referred to as a one-time LBT procedure where a UE 115 may perform channel sensing for a defined duration (e.g., 25 μs). Further, a category 4 LBT procedure may be referred to as a fairness-based LBT procedure for performing channel sensing with a backoff, where the backoff may be used to prevent a UE 115 from accessing a channel immediately after detecting that the channel is clear.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ feedback may include an ACK indicating that a message is received successfully or a NACK indicating that a device failed to receive or decode a message. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As mentioned above, a UE 115 in wireless communications system 100 may be able to communicate directly with other UEs 115 over a sidelink connection (e.g., using a P2P or D2D protocol). Such communications may be referred to as D2D or sidelink communications. One or more of a group of UEs 115 utilizing sidelink communications may be within the geographic coverage area 110 of a base station 105. In some cases, other UEs 115 in such a group may be outside the geographic coverage area 110 of the base station 105 or may be otherwise unable to receive transmissions from the base station 105. In such cases, the UEs 115 within the geographic coverage area 110 of the base station 105 may relay communications between the base station 105 and the UEs 115 outside the geographic coverage area 110 of the base station 105. UEs 115 communicating via sidelink communications may utilize a one-to-many (1:M) system in which each UE 115 transmits to every other UE 115 in the group. In some cases, sidelink communications may include communications over one or more channels. Sidelink data transmissions may be over a physical sidelink shared channel (PSSCH), discovery expression transmissions may be over a physical sidelink discovery channel (PSDCH) (e.g., to allow proximal devices to discover each other's presence), control information transmissions may be over a physical sidelink control channel (PSCCH), and feedback transmissions may be over a physical sidelink feedback channel (PSFCH).

In some aspects, UEs 115 in wireless communications system 100 may support sidelink communications in a shared spectrum. In such systems, a UE 115 may contend for access to the shared radio frequency spectrum to transmit sidelink data to another UE 115. For instance, a UE 115 may perform LBT to gain access to the shared radio frequency spectrum for a sidelink transmission to another UE 115. In some aspects, a base station 105-a may schedule sidelink communications (e.g., grant resources for sidelink communications) between UEs 115 (e.g., in a resource allocation mode 1). In other aspects, UEs 115 (e.g., a transmitting UE 115 and a receiving UE 115) may identify resources for communications with each other without the involvement of a base station 105 (e.g., in a resource allocation mode 2).

Figure 2:
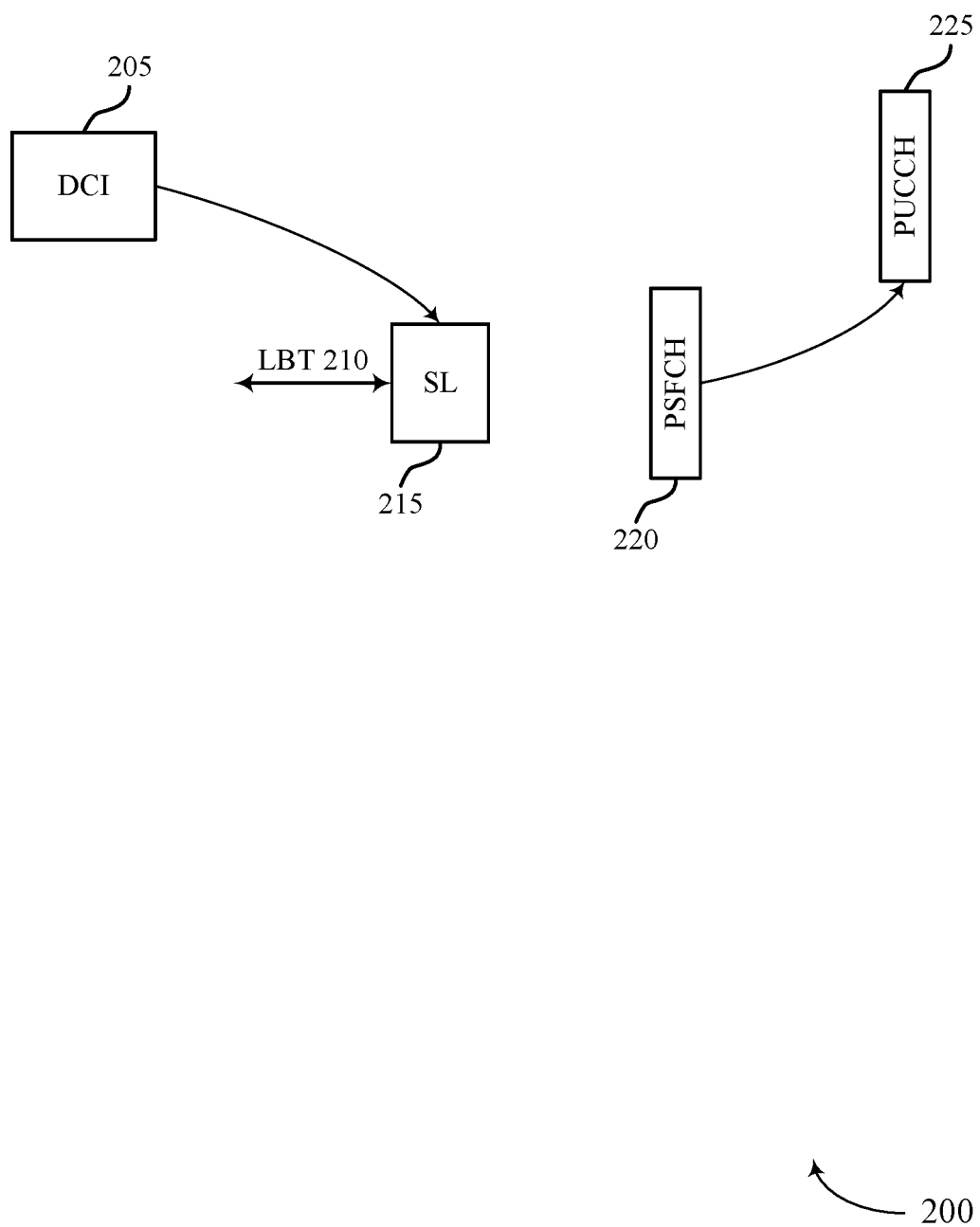
FIG. 2 illustrates an example of sidelink communications in a shared radio frequency spectrum in accordance with aspects of the present disclosure.

FIG. 2 illustrates an example of sidelink communications 200 in a shared radio frequency spectrum in accordance with aspects of the present disclosure. In FIG. 2, a base station 105 may transmit DCI 205 to a UE 115 scheduling sidelink communications between the UE 115 and another UE 115 in the shared radio frequency spectrum. The UE 115 may perform LBT 210 to gain access to the shared radio frequency spectrum for a sidelink transmission 215. If the LBT 210 is successful, the UE 115 may transmit the sidelink transmission 215 to a receiving UE 115, and the UE 115 may monitor a PSFCH 220 for an ACK or a NACK from the receiving UE 115. The UE 115 may then report the ACK or the NACK to the base station 105 in a PUCCH 225. Alternatively, if the LBT 210 fails, the UE 115 may report a NACK to the base station 105 in the PUCCH 225.

In some cases, a NACK in the PUCCH 225 may not reflect whether the LBT 210 failed (e.g., LBT failure) or whether the receiving UE 115 failed to decode the sidelink transmission 215 after a successful LBT 210 (e.g., decoding failure). In such cases, the UE 115 may be configured to report an LBT failure to the base station 105 in the PUCCH 225, and the PUCCH 225 may include one additional LBT outcome bit per PSSCH transmission per DCI 205 (e.g., an ACK or NACK bit and an LBT outcome bit per PSSCH may be jointly encoded in two bits). That is, the UE 115 may report LBT failure directly to the base station 105 using the PUCCH resource allocated for ACK or NACK reporting (e.g., in a resource allocation mode 1). Accordingly, the PUCCH 225 granted by the DCI 205 (e.g., DCI format 3_0) may be at a location assuming the sidelink transmission 215 (e.g., a scheduled PSSCH) is transmitted and the corresponding PSFCH 220 is received. In some examples, layer one (L1) based LBT failure reporting may have a minimal delay (e.g., smaller delay), and LBT reporting may be in addition to (e.g., on top of) ACK or NACK reporting. Further, a UE 115 may transmit one LBT report per subband or group of subbands.

Because the UE 115 may report results of the LBT 210 to the base station 105, the base station 105 may be able to schedule sidelink transmissions from the UE 115 based on the results of the LBT 210. For instance, the base station 105 may schedule the UE 115 for sidelink communications on a different band if the results of the LBT indicate that the UE 115 has been unable to gain access to a previous band. As such, the UE 115 may experience increased throughput in sidelink communications since the scheduling at the base station 105 may be improved. In some aspects, to further minimize control or scheduling overhead, a base station 105 may allocate multiple TTIs to a UE 115 for sidelink communications with another UE 115. For example, multi-TTI scheduling in resource allocation mode 1 may be introduced for a sidelink, transmitting UE to transmit multiple transport blocks with a single DCI grant to save DCI signaling for bursty traffic and address LBT uncertainty (e.g., increase the chances that LBT is successful).

Figure 3:
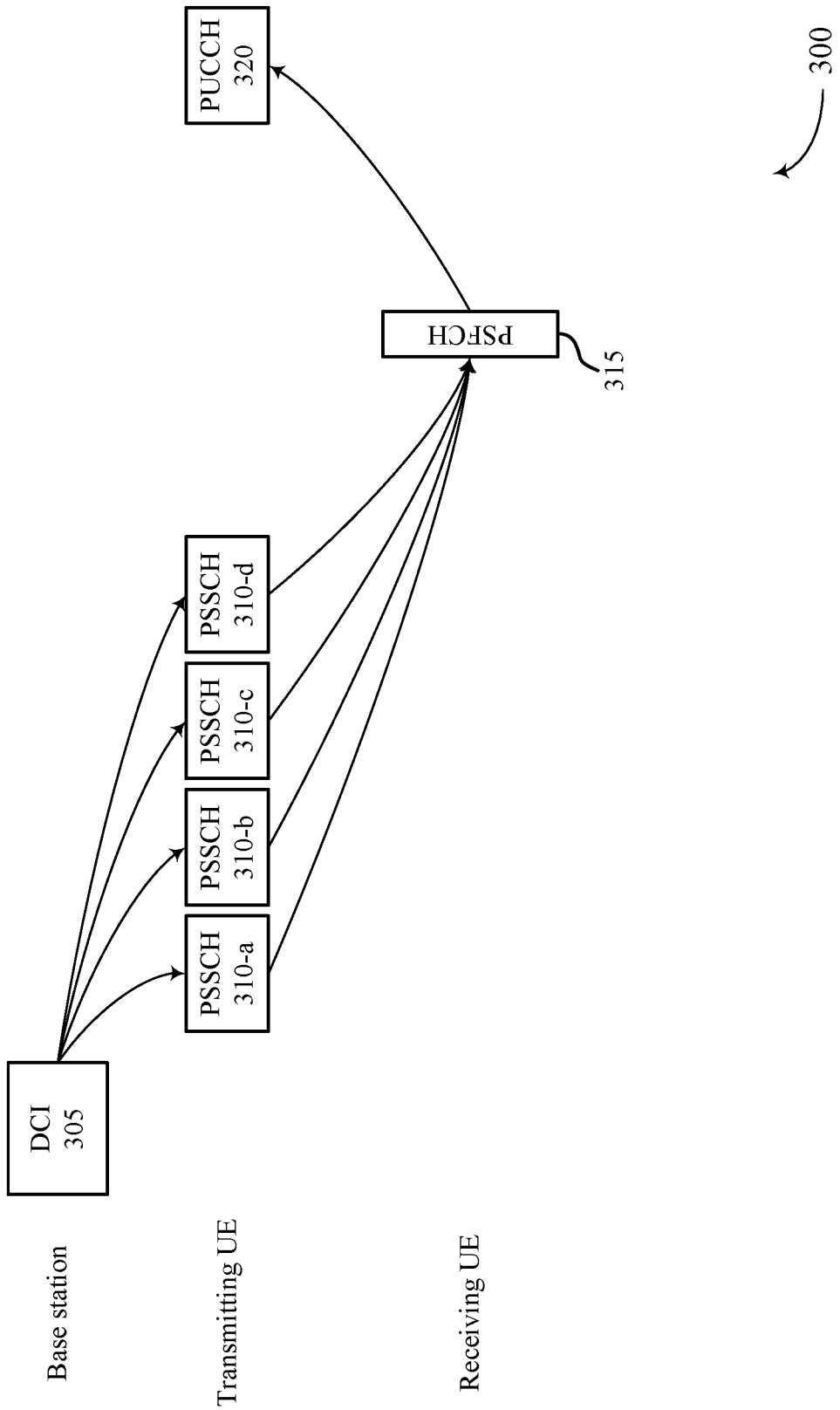
FIG. 3 illustrates an example of multi-TTI scheduling in accordance with aspects of the present disclosure.

FIG. 3 illustrates an example of multi-TTI scheduling 300 in accordance with aspects of the present disclosure. In FIG. 3, a base station 105 may transmit a DCI 305 to a transmitting UE 115 scheduling sidelink communications between the transmitting UE 115 and a receiving UE 115 in multiple (e.g., four) TTIs. The DCI 305 may be referred to as a sidelink multi-TTI grant. After receiving the DCI 305 (e.g., for the sidelink multi-TTI grant), the transmitting UE 115 may attempt LBT sequentially starting at the beginning of the scheduled TTIs (e.g., slots) until the LBT succeeds, and the transmitting UE 115 may transmit on the remainder (e.g., the rest) of the scheduled slots in a burst after the LBT succeeds (e.g., without LBT or without performing LBT again after the LBT is successful). That is, the transmitting UE 115 may transmit one or more of the PSSCH 310-a, PSSCH 310-b, PSSCH 310-c, and the PSSCH 310-d. The transmitting UE 115 may then monitor a PSFCH 315 for ACK or NACK feedback for one or more of the PSSCH 310-a, PSSCH 310-b, PSSCH 310-c, and the PSSCH 310-d from the receiving UE 115, and the transmitting UE 115 may transmit the ACK or NACK feedback for the PSSCHs 310 to the base station 105 in the PUCCH 320. For instance, there may be a single PUCCH resource assigned for the ACK or NACK reporting for all scheduled TTIs (e.g., slots).

In some aspects, it may be of interest to upper layers (e.g., at a base station 105 or a UE 115) to learn (e.g., identify) how many attempts at an LBT are made to clear the LBT for a subband or a percentage of LBT failure (e.g., NACKs not due to failed reception of sidelink transmissions). To improve scheduling at a base station 105, as in the example of FIG. 2, the transmitting UE 115 may be configured to report LBT failures to the base station 105. That is, wireless communications system 100 may support efficient techniques for LBT failure reporting for multiple TTIs to improve scheduling for sidelink communications. In an example, the transmitting UE 115 may transmit an LBT report to the base station 105, and the LBT report may assist in making an LBT subband selection in a MAC or upper layer. Thus, the DCI 305 (e.g., multi-TTI grant) may assign the same subbands for multiple TTIs (e.g., scheduled slots), and a MAC layer may make smarter scheduling decisions based on prior LBT reports.

In addition to supporting techniques for LBT failure reporting, it may be appropriate for wireless communications system 100 to improve the use of sidelink assignment indicators (SAI) to facilitate multi-TTI grants or DCI.

Figure 4:
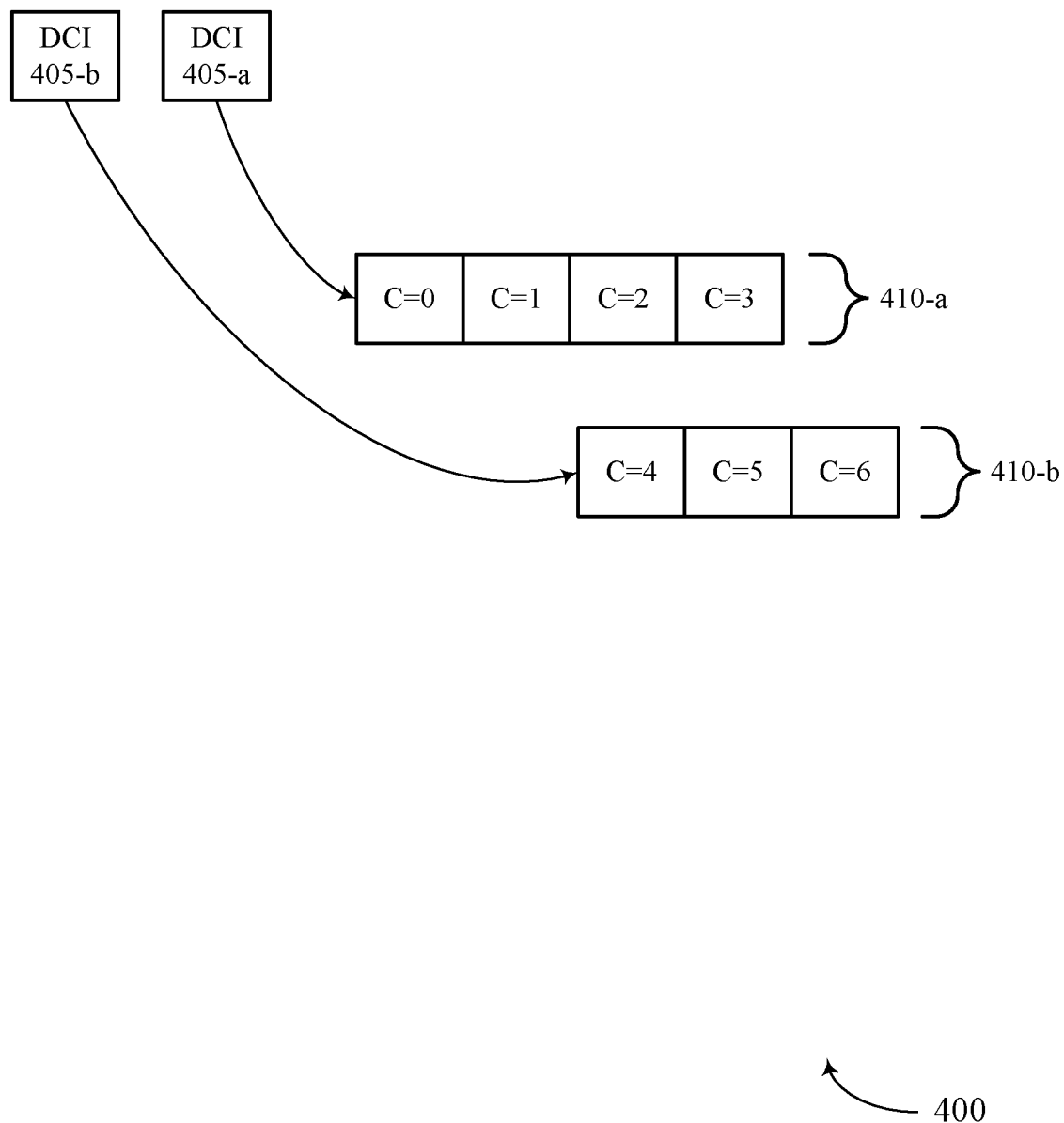
FIG. 4 illustrates an example of multi-TTI grants in accordance with aspects of the present disclosure.

FIG. 4 illustrates an example of multi-TTI grants 400 in accordance with aspects of the present disclosure. In FIG. 4, a base station 105 may transmit a DCI 405-a scheduling sidelink transmissions 410-a in multiple TTIs, and the base station 105 may transmit a DCI 405-b scheduling sidelink transmissions 410-b in multiple TTIs. In some cases, the base station 105 may also transmit a SAI with each DCI 405 to indicate an accumulative number of DCIs 405 (e.g., or PDCCH monitoring occasions scheduling PSSCH transmissions) transmitted to a UE 115. The UE 115 may receive each DCI 405 and may determine whether the UE 115 missed previous DCI 405 from the base station 105 based on the SAI included in the DCI 405. In some examples, the SAI may be two bits and may indicate an accumulative quantity of up to four DCIs. In such examples, five consecutive, missed DCIs may be detected by a UE 115, but the UE 115 may treat the five missed DCIs as a single missed DCI. For instance, the sixth DCI may be transmitted with an SAI of '01,' and the UE 115 may determine that the UE 115 missed one DCI with an SAI of '00.' As a result, there may be a HARQ payload mismatch between a base station 105 and a UE 115 (e.g., since the UE 115 may not transmit HARQ feedback for the first four missed DCIs). In some cases, however, because the probability that a UE 115 misses five consecutive DCIs is low, a two-bit SAI may be sufficient.

In some aspects, if a base station 105 is configured to utilize multi-TTI grants to schedule sidelink communications for a UE 115, the base station 105 may transmit an SAI for each TTI scheduled. In such aspects, the UE 115 may not be able to determine when a DCI 405 is missing. For instance, if the UE 115 misses a DCI 405-a scheduling sidelink transmissions 410-a in four TTIs, and the base station 105 utilizes a two-bit SAI, the missed DCI may include SAIs with values '00,' '01,' '10,' and '11.' Accordingly, a next DCI 405-b scheduling subsequent sidelink communications may include an SAI of '00,' and the UE 115 may not be able to detect the missed DCI 405-a (e.g., since the DCI 405-b would include the SAI of '00' regardless of whether the UE 115 missed the DCI 405-a). Similarly, for a multi-TTI grant, a single missed DCI may be associated with five consecutive TTIs (e.g., slots), and a UE 115 (e.g., a transmitter) may detect the single missed DCI as a single missed TTI (e.g., slot). Thus, if a base station 105 and a UE 115 supports multi-TTI scheduling (e.g., for four or more slots), there may be ambiguity between the base station 105 and a UE 115 on how many DCIs were transmitted, which may lead to inefficiencies in a wireless communications system. Wireless communications system 100 may support efficient techniques for utilizing SAIs to support the use of multi-TTI grants.

Figure 5:
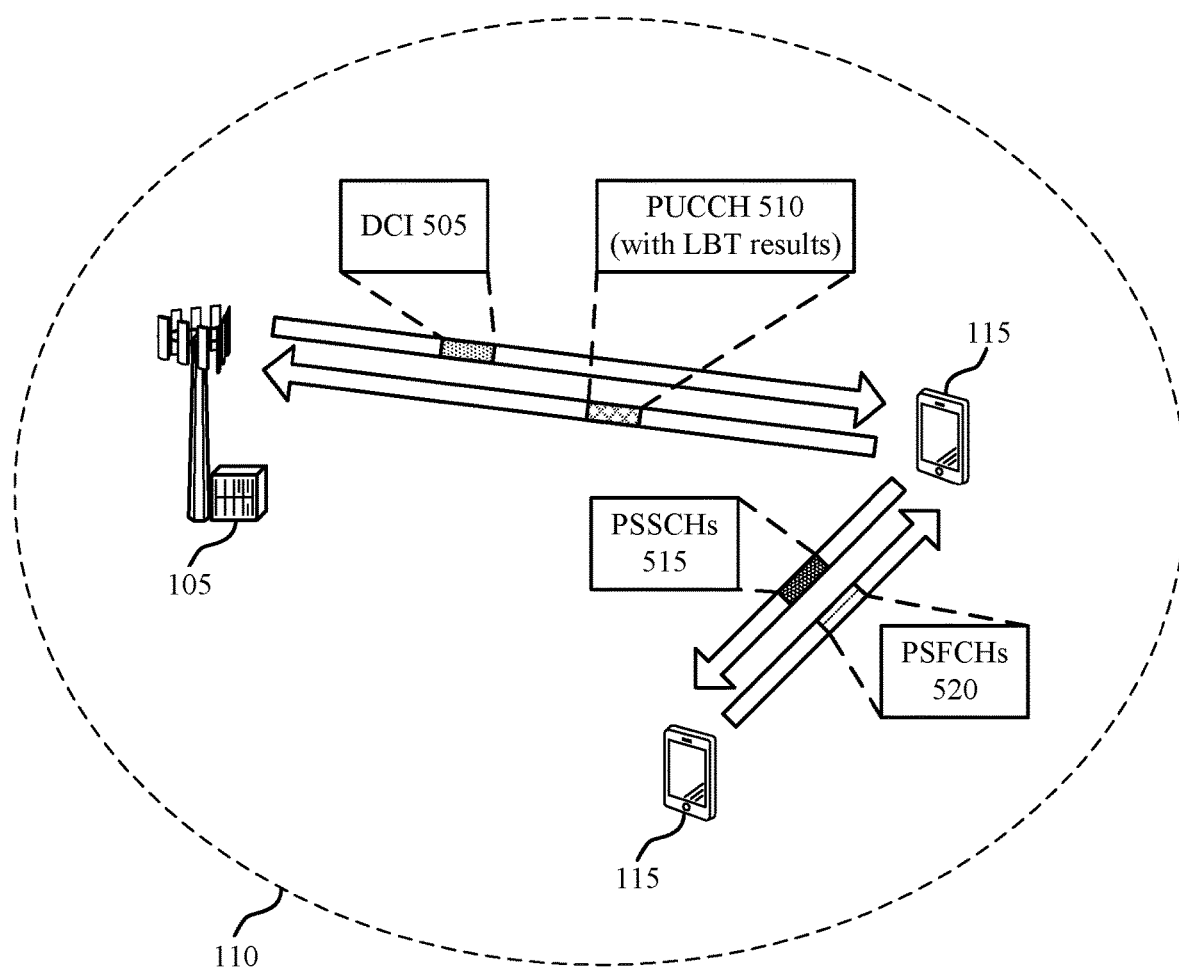
FIG. 5 illustrates an example of a wireless communications system that supports techniques for LBT failure reporting for multiple TTIs in accordance with aspects of the present disclosure.

FIG. 5 illustrates an example of a wireless communications system 500 that supports techniques for LBT failure reporting for multiple TTIs in accordance with aspects of the present disclosure. The wireless communications system 500 includes UEs 115, which may each be an example of a UE 115 described with reference to FIGS. 1-4. The wireless communications system 500 also includes a base station 105, which may be an example of a base station 105 described with reference to FIGS. 1-4. The base station 105 may provide communication coverage for UEs 115 in a geographic coverage area 110, which may be an example of a geographic coverage area 110 described with reference to FIG. 1. The base station 105 may schedule sidelink communications between the UEs 115 on a shared spectrum (e.g., in a resource allocation mode 1 for sidelink communications).

The wireless communications system 500 may implement aspects of wireless communications system 100. For example, the wireless communications system 500 may support efficient techniques for LBT failure reporting for multiple TTIs to improve scheduling for sidelink communications. Specifically, a UE 115 may support LBT reporting on ACK or NACK PUCCH resources for a multi-TTI grant. The UE 115 may also support options for efficient codebook design for an LBT report for a multi-TTI grant. Further, the wireless communications system 500 may support efficient techniques for utilizing SAIs to facilitate the use of multi-TTI grants. For instance, the base station 105 and the UE 115 may support a SAI counter in DCI (e.g., a DCI 3_0) to address multi-TTI grants.

The base station 105 may transmit DCI 505 to a first UE 115 scheduling sidelink transmissions in PSSCHs 515 from the first UE 115 to a second UE 115. The DCI 505 may be an example of or may include a multi-TTI grant, and the DCI 505 (e.g., single DCI grant) may schedule multiple PSSCH transmissions in one or more sets (e.g., bursts) of multiple TTIs over a shared spectrum. The first UE 115 may then perform an LBT for one or more TTIs in the one or more sets of multiple TTIs. If the LBT passes for any of the TTIs, the first UE 115 may transmit the PSSCHs 515 in the TTI in a set for which the LBT passes and subsequent TTIs in the set. That is, the first UE 115 (e.g., a transmitter or transmitting UE 115) may not perform additional LBT during a scheduled PSSCH transmission burst after the LBT (e.g., first LBT) passes in the scheduled PSSCH transmission burst.

After the first UE 115 transmits the PSSCHs 515, the first UE 115 may monitor for ACK or NACK feedback for the PSSCHs 515 in one or more PSFCHs 520 from the second UE 115. The first UE 115 may then transmit the ACK or NACK feedback for the PSSCHs 515 in a PUCCH 510 to the base station 105. Using the techniques described herein, the first UE 115 may also transmit results of the LBT performed for the one or more TTIs in the one or more sets of multiple TTIs in the PUCCH 510 to the base station 105. In one example, the first UE 115 may transmit an LBT outcome bit along with an ACK or NACK for each TTI of the multiple TTIs allocated for PSSCH transmissions. In another example, the first UE 115 may transmit an indication of a TTI of the multiple TTIs allocated for PSSCH transmissions in which an LBT is successful. In yet another example, the first UE 115 may transmit an indication of a quantity of TTIs of the multiple TTIs allocated for PSSCH transmissions in which an LBT failed (e.g., or succeeded). The base station 105 may then use the results of the LBT received from the first UE 115 to schedule subsequent sidelink transmissions from the first UE 115, and the throughput of sidelink communications in wireless communications system 500 may be improved.

In addition to reporting LBT failure, the wireless communications system 500 may support efficient techniques for utilizing SAIs to facilitate the use of multi-TTI grants. In one aspect, the wireless communications system 500 may increase a quantity of SAI bits to support multi-TTI grants. For instance, a counter SAI field may be adjusted to include $\lceil \log_2 N_{slot} \rceil$ bits (e.g., plus a constant), where $N_{slot}$ represents the maximum number of slots supported by a multi-TTI grant. In some cases, $N_{slot}$ may be RRC configured. In another aspect, the base station 105 may reuse an ACK or NACK counter SAI for LBT outcome bits in addition to ACK or NACK bits. For instance, an LBT outcome bit and an ACK or NACK bit associated with a PSSCH slot may be bundled and counted together in a SAI. In such cases, if a missed DCI is detected, the first UE 115 may pad LBT outcome bits with a '0' and pad ACK or NACK bits with a NACK (e.g., in the PUCCH 510).

In some other aspects, a number of LBT outcome bits reported by the first UE 115 may depend on a number of contiguous sets of multiple TTIs allocated for sidelink transmissions (e.g., number of contiguous bursts) and a maximum length of a set of multiple TTIs allocated for sidelink transmissions (e.g., a burst) or a number of TTIs allocated for sidelink transmissions. In such aspects, the base station 105 may introduce a separate SAI (e.g., separate counter SAI) in DCI which counts for LBT outcome bits (e.g., only). The separate SAI may be referred to as an LBT SAI. Additionally, or alternatively, the base station 105 may use a single SAI (e.g., single counter SAI) in DCI to count for LBT outcome bits and ACK or NACK bits. The LBT SAI or the single SAI may both be used in DCI scheduling multiple PSSCH transmissions (e.g., a multi-TTI grant) or DCI scheduling a single PSSCH transmission (e.g., a single-TTI grant).

If the base station 105 is configured to transmit the LBT SAI in the DCI 505, the base station 105 may increment the LBT SAI based on a quantity of LBT outcome bits that the first UE 115 is to transmit in the PUCCH 510 scheduled by the DCI 505. For a single-TTI grant, the base station 105 may increment the LBT SAI by one for each DCI (e.g., for the next DCI). For a multi-TTI grant, the base station 105 may increment the LBT SAI by a quantity of LBT outcome bits (e.g., with modulo) to be transmitted by the first UE 115 (e.g., for the next DCI). If the base station 105 is configured to transmit the single SAI in the DCI 505, the quantity of bits used for the single SAI may be increased to support a combined payload (i.e., LBT outcome bits and ACK or NACK bits). In any case, if the first UE 115 misses a DCI (e.g., a missed DCI is detected), the first UE 115 may pad LBT outcome bits in the PUCCH 510 with a defined value (e.g., all ones), and the first UE 115 may pad ACK or NACK bits with all NACKs (e.g., which is interpreted as LBT failure in all slots and NACK in all slots).

Figure 6:
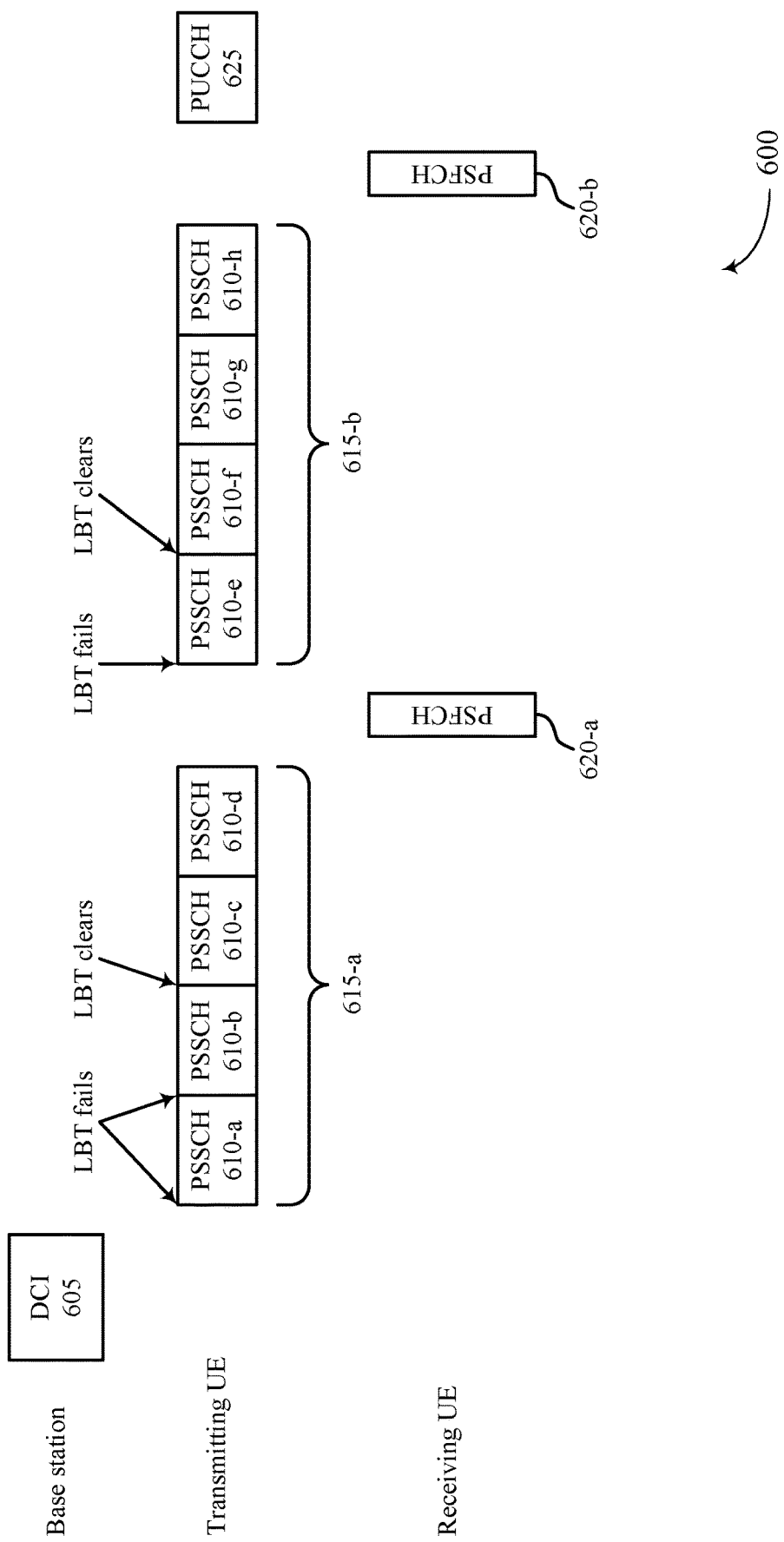
FIG. 6 illustrates an example of LBT failure reporting in accordance with aspects of the present disclosure.

FIG. 6 illustrates an example of LBT failure reporting 600 in accordance with aspects of the present disclosure. A base station 105 may transmit DCI 605 to a first UE 115 (e.g., a transmitting UE 115) scheduling sidelink transmissions in PSSCHs 610 from the first UE 115 to a second UE 115 (e.g., a receiving UE 115) in one or more sets 615 (e.g., bursts) of multiple TTIs over a shared radio frequency spectrum. The DCI 605 may include or may be referred to as a multi-TTI grant. The multi-TTI grant may include a K1 value indicating a timing for ACK or NACK feedback (e.g., similar to a K1 with respect to a last associated PSFCH and a PDSCH resource element mapping indicator (PRI)). Because the sets 615 of multiple TTIs may be separated in a time domain (e.g., by a gap), the first UE 115 may perform an LBT to gain access to the shared radio frequency spectrum for the sidelink transmissions for each of the sets 615. In addition, the first UE 115 may receive ACK or NACK feedback from the second UE in a PSFCH 620 after the sidelink transmissions in each of the sets 615.

The first UE 115 may transmit PSSCHs 610-*a*, 610-*b*, 610-*c*, and 610-*d* in a set 615-*a*, and the first UE 115 may monitor a PSFCH 620-*a* for ACK or NACK feedback for the PSSCHs 610 in the set 615-*a* from the second UE 115. Similarly, the first UE 115 may transmit PSSCHs 610-*e*, 610-*f*, 610-*g*, and 610-*h* in a set 615-*b*, and the first UE 115 may monitor a PSFCH 620-*b* for ACK or NACK feedback for the PSSCHs 610 in the set 615-*b* from the second UE 115. The first UE 115 may then transmit ACK or NACK feedback (e.g., received in the PSFCHs 620-*a* and 620-*b*) to the base station 105 in the PUCCH 625, and the first UE 115 may transmit results of LBT performed for one or more TTIs in the one or more sets 615 of multiple TTIs in the PUCCH 625. Thus, LBT outcome bits may be transmitted along with ACK or NACK bits in a PUCCH resource indicated by a multi-TTI grant. In FIG. 6, the first UE 115 may indicate to the base station 105 that LBT failed for first and second TTIs in the set 615-*a* and LBT passed (e.g., cleared) for a third TTI in the set 615-*a*. The first UE 115 may also indicate that LBT failed for a first TTI in the set 615-*b* and LBT passed for a second TTI in the set 615-*b*.

In one aspect, the first UE 115 may transmit an LBT outcome bit along with an ACK or NACK for each TTI in the one or more sets 615 of multiple TTIs (e.g., an LBT outcome bit per scheduled PSSCH). In some cases, the first UE 115 may transmit one bit to indicate if an LBT passes or fails for each of the scheduled PSSCHs or TTIs (e.g., slots) scheduled by a multi-TTI grant. Additionally, or alternatively, the first UE 115 may jointly encode an LBT outcome bit with an ACK or NACK bit, and the jointly encoded bits may be associated with three state (e.g., tri-state) feedback for a same PSSCH or TTI. For instance, the first UE 115 may transmit two bits that jointly indicate one of three states: a successful LBT and an ACK, a successful LBT and a NACK, or an unsuccessful LBT. The use of jointly encoded bits may be useful (e.g., to limit overhead) for the case that scheduled resources are discontinuous and multiple separate LBTs may be performed (e.g., in the case that sidelink resource pools are not continuous in time or gaps between a physical sidelink control channel (PSCCH) and PSSCH are similar to those in V2X).

In another aspect, the first UE 115 may transmit an indication of a TTI in each set 615 of multiple TTIs in which an LBT is successful. For instance, the indication of an LBT outcome bit for each TTI may not exploit correlation of LBT outcomes in multi-TTI scheduled TTIs (e.g., slots), so the first UE 115 may instead indicate a relative slot index or indices in a set (e.g., burst) where LBT passes (e.g., in the multi-TTI grant). For a multi-TTI grant, after clearing an LBT, the first UE 115 (e.g., a transmitter) may transmit a contiguous burst within a channel occupancy time (COT) without LBT (e.g., without reperforming the LBT). As such, it may be appropriate to indicate a relative slot index where an LBT clears (e.g., with respect to or relative to a first slot in a respective scheduled burst). If a PSSCH burst (e.g., set 615) has more than a threshold (e.g., 16 µs) gap (e.g., until another contiguous burst) due to a configured PSFCH 620, the first UE 115 may perform an additional LBT as the gap divides later scheduled TTIs into another contiguous burst. Hence, the first UE 115 may indicate another LBT clearing TTI (e.g., a TTI in which LBT clears) with respect to the respective burst (e.g., if needed).

In FIG. 6, the first UE 115 may indicate that an LBT passed or cleared in a third TTI in the set 615-a of multiple TTIs, and the first UE 115 may indicate that an LBT passed or cleared in a second TTI in the set 615-b of multiple TTIs. In some cases, a quantity of LBT clearing TTI indices indicated by the first UE 115 may depend on a maximum number of contiguous sets 615 (e.g., bursts or quantity of gaps greater than the threshold gap) of TTIs scheduled by the DCI 605 (e.g., the multi-TTI grant). The first UE 115 may indicate a TTI index using $\lceil \log_2 N_{slot,burst}+1 \rceil$ bits, where $N_{slot,burst}$ is a maximum number of contiguous TTIs in each set 615 (e.g., each scheduled transmission burst). In an example, a base station 105 may schedule eight PSSCH transmissions using a multi-TTI DCI with a maximum of two contiguous four-slot bursts. In this example, the first UE 115 may indicate two LBT clearing TTI indices for up to two bursts using $\lceil \log_2 5 \rceil = 3$ bits. Thus, the first UE 115 may use six bits for LBT results (e.g., LBT outcome bits) plus eight bits for ACK or NACK feedback (e.g., as opposed to 16 bits if the first UE 115 indicates an LBT outcome bit for each TTI). In some examples, LBT outcome bits '0000' may indicate that LBT cleared in a $0^{th}$ slot, LBT outcome bits '0001' may indicate that LBT cleared in a first slot, and so on with all ones ('1111') indicating that LBT failed in all TTIs in a burst.

In yet another aspect, the first UE 115 may transmit an indication of a quantity of TTIs in the sets 615 of multiple TTIs in which an LBT failed. For instance, instead of identifying a pattern of LBT failure, it may be appropriate for a MAC or higher layer at a base station 105 to identify a percentage of LBT failure among scheduled TTIs. As such, the first UE 115 may indicate a number of TTIs among TTIs scheduled by a multi-TTI grant in which LBT failed. In some cases, the scheduled TTIs (e.g., resources) may be discontinuous (e.g., including multiple sets 615). In any case, the first UE 115 may indicate (e.g., in a layer one LBT report) the quantity of TTIs using $\lceil \log_2 N_{slot,grant}+1 \rceil$ bits, where $N_{slot,grant}$ is a number of TTIs across all sets 615 of multiple TTIs scheduled by the DCI 605. The base station 105 may then compute a percentage of LBT failures by averaging multiple LBT reports. In some examples, LBT outcome bits '0000' may indicate that LBT failed in zero TTIs, LBT outcome bits '0001' may indicate that LBT failed in one slot, and default LBT outcome bits '1111' may indicate that LBT failed in all scheduled TTIs. In FIG. 6, the first UE 115 may indicate that LBT failed in three TTIs.

Figure 7:
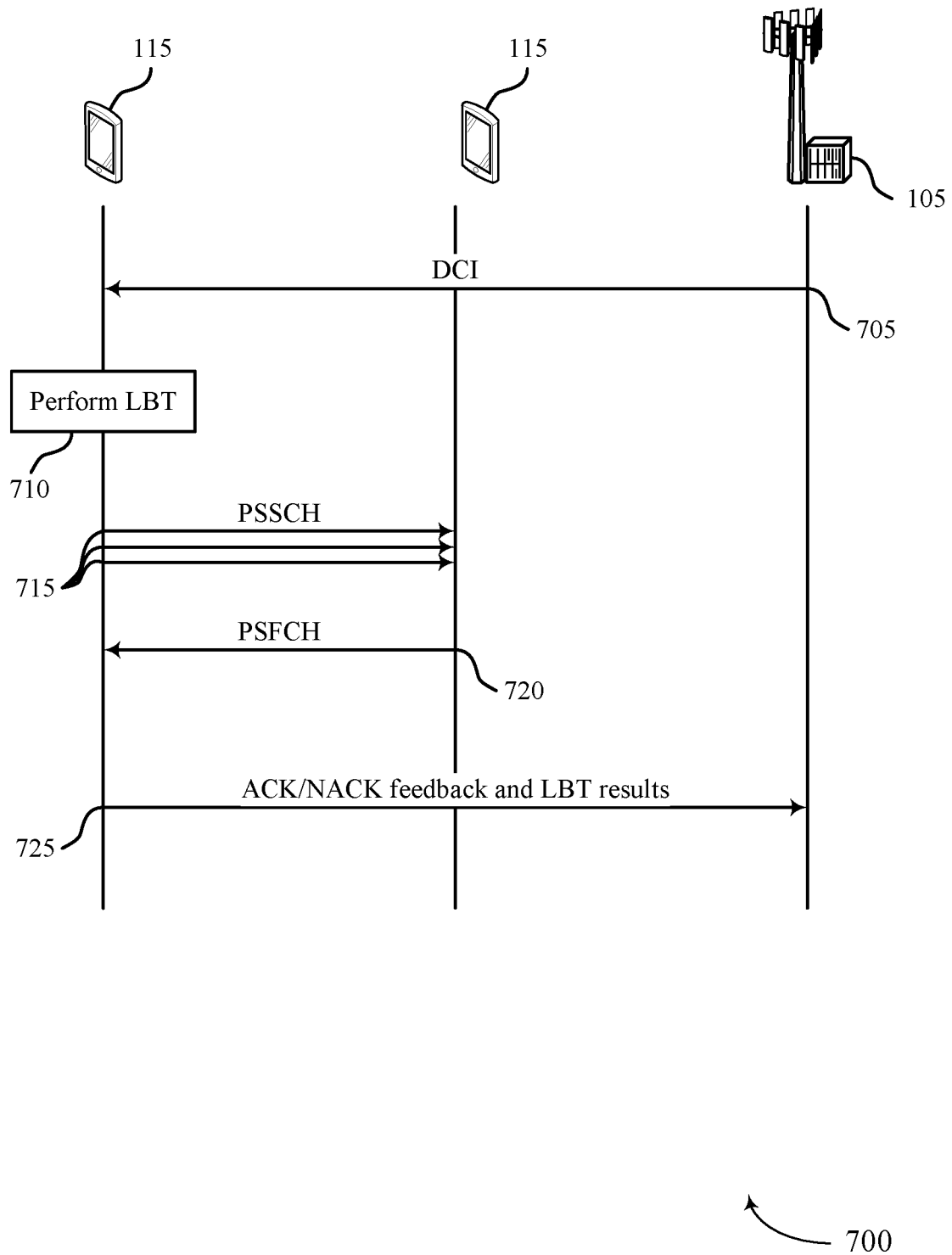
FIG. 7 illustrates an example of a process flow that supports techniques for LBT failure reporting for multiple TTIs in accordance with aspects of the present disclosure.

FIG. 7 illustrates an example of a process flow 700 that supports techniques for LBT failure reporting for multiple TTIs in accordance with aspects of the present disclosure. Process flow 700 includes UEs 115, which may be examples of UEs 115 described with reference to FIGS. 1-6. Process flow 700 also includes a base station 105, which may be an example of a base station 105 described with reference to FIGS. 1-6. The process flow 700 may implement aspects of wireless communications system 500. For example, the process flow 700 may support efficient techniques for LBT failure reporting for multiple TTIs to improve scheduling for sidelink communications.

In the following description of the process flow 700, the signaling exchanged between the UEs 115 and between the UEs 115 and the base station may be exchanged in a different order than the example order shown, or the operations performed by the UEs 115 and the base station 105 may be performed in different orders or at different times. Some operations may also be omitted from the process flow 700, and other operations may be added to the process flow 700.

At 705, the base station 105 may transmit, and a first UE 115 may receive, DCI scheduling sidelink transmissions, from the first UE 115 to a second UE 115, in one or more sets of multiple TTIs over a shared radio frequency spectrum. At 710, the first UE 115 may perform LBT for one or more TTIs in the one or more sets of multiple TTIs. At 715, the first UE 115 may then transmit sidelink transmissions in one or more PSSCHs if the LBT is successful for at least one TTI. For example, the first UE 115 may perform LBT for one or more TTIs in each set of multiple TTIs, and, if LBT passes for a TTI in a set of multiple TTIs, the first UE 115 may determine that LBT is successful for the TTI in the set in which the LBT passed and all subsequent TTIs in the set. Accordingly, the first UE 115 may transmit sidelink transmissions in the PSSCHs in the TTI in each set in which the LBT passed (e.g., is successful) and all subsequent TTIs in the set. At 720, the first UE 115 may then monitor for ACK or NACK feedback in one or more PSFCHs for the transmitted sidelink transmissions (e.g., transmitted PSSCHs).

At 725, the first UE 115 may transmit, to the base station 105 in an uplink control channel (e.g., PUCCH) allocated for ACK or NACK feedback for the sidelink transmissions, an indication of results of the LBT performed for the one or more TTIs. For instance, the first UE 115 may transmit the results of the LBT along with the ACK or NACK feedback for the sidelink transmissions.

In one aspect, the first UE 115 may transmit, for each TTI in the one or more sets of multiple TTIs, two bits indicating an ACK or a NACK for the TTI and an outcome of the LBT for the TTI. In some cases, a first bit of the two bits indicates the ACK or the NACK, and a second bit of the two bits indicates the outcome of the LBT. In other cases, the two bits may jointly indicate one of three states corresponding to a successful LBT and an ACK, a successful LBT and a NACK, and an unsuccessful LBT.

In another aspect, the first UE 115 may transmit, for each set of the one or more sets of multiple TTIs, an indication of TTIs in the set in which the LBT is successful. In some cases, the indication of TTIs in the set in which the LBT is successful includes an index of a TTI in the set in which the LBT is successful. The index of the TTI in the set in which the LBT is successful may be relative to an index of a first TTI in the set (e.g., a TTI preceding all other TTIs in the set in a time domain). In some cases, a quantity of bits used for the indication of TTIs in the set in which the LBT is successful may be based on a number of TTIs in the set.

In yet another aspect, the first UE 115 may transmit an indication of a quantity of TTIs in the one or more sets in which the LBT is successful. A quantity of bits used for the indication of the quantity of TTIs in the one or more sets in which the LBT is successful may be based on a quantity of TTIs in the one or more sets.

In some cases, the base station 105 may transmit, and the first UE 115 may receive, in the DCI, an SAI indicating an accumulative quantity of TTIs in which the first UE is scheduled to transmit sidelink transmissions. In such cases, the first UE 115 may detect that the first UE 115 failed to receive previous DCI scheduling previous sidelink transmission from the first UE 115 based on the SAI, and the first UE 115 may transmit, in the uplink control channel, a NACK and an indication of an unsuccessful LBT for each of the previous sidelink transmissions based on the detecting. A quantity of bits used for the SAI may be based on a maximum number of TTIs supported by the DCI (e.g., a maximum number of TTIs that the DCI may grant for a transmission).

In some cases, the base station 105 may transmit, and the first UE 115 may receive, in the DCI in addition to the SAI, an LBT SAI indicating an accumulative quantity of LBT outcome bits to be transmitted by the first UE 115 to the base station 105. In such cases, the first UE 115 may detect that the first UE 115 failed to receive previous DCI scheduling previous sidelink transmissions from the first UE 115 based on the SAI and that the first UE 115 failed to transmit LBT outcome bits for the previous sidelink transmissions based on the LBT SAI, and the first UE 115 may transmit, in the uplink control channel, a NACK for each of the previous sidelink transmissions and LBT outcome bits set to one for the previous sidelink transmissions indicating an unsuccessful LBT for each of the previous sidelink transmissions based on the detecting.

In some cases, the base station 105 may transmit, and the first UE 115 may receive, in the DCI, an SAI indicating a first accumulative quantity of TTIs in which the first UE 115 is scheduled to transmit sidelink transmissions plus a second accumulative quantity of LBT outcome bits to be transmitted by the first UE 115 to the base station 105. In such cases, the first UE 115 may detect that the first UE 115 failed to receive previous DCI scheduling previous sidelink transmissions from the first UE and failed to transmit LBT outcome bits for the previous sidelink transmissions based on the SAI, and the first UE 115 may transmit, in the uplink control channel, a NACK for each of the previous sidelink transmissions and LBT outcome bits set to one for the previous sidelink transmissions indicating an unsuccessful LBT for each of the previous sidelink transmissions based on the detecting.

Figure 8:
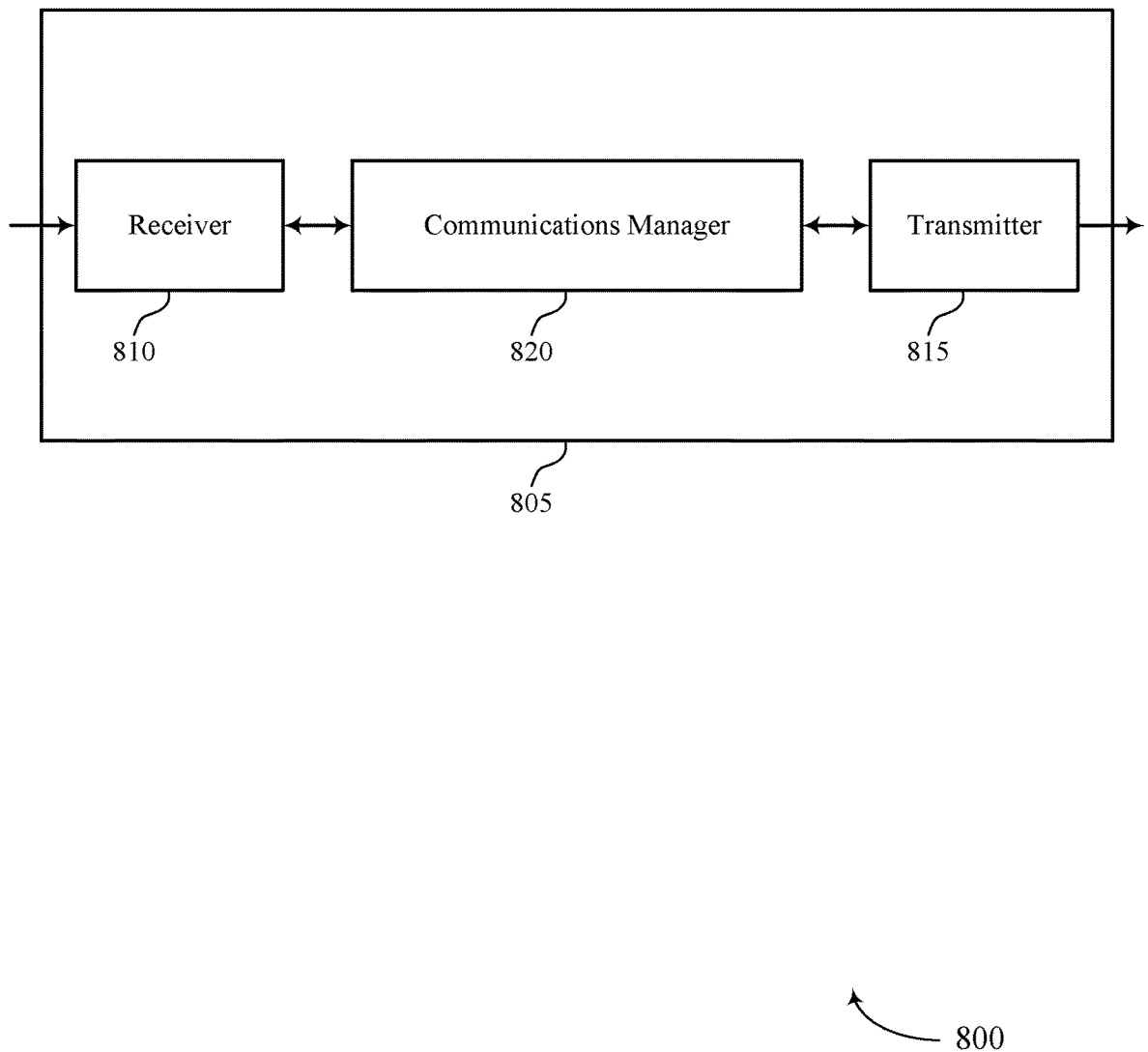
FIGS. 8 and 9 show block diagrams of devices that support techniques for LBT failure reporting for multiple TTIs in accordance with aspects of the present disclosure.

FIG. 8 shows a block diagram 800 of a device 805 that supports techniques for LBT failure reporting for multiple TTIs in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for LBT failure reporting for multiple TTIs). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for LBT failure reporting for multiple TTIs). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for LBT failure reporting for multiple TTIs as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first UE in accordance with examples as disclosed herein. For example, the communications manager 820 may be configured as or otherwise support a means for receiving, from a base station, downlink control information scheduling sidelink transmissions, from the first UE to a second UE, in one or more sets of multiple transmission time intervals over a shared radio frequency spectrum. The communications manager 820 may be configured as or otherwise support a means for performing listen-before-talk for one or more transmission time intervals in the one or more sets of multiple transmission time intervals. The communications manager 820 may be configured as or otherwise support a means for transmitting, to the base station in an uplink control channel allocated for acknowledgment or negative acknowledgment feedback for the sidelink transmissions, an indication of results of the listen-before-talk performed for the one or more transmission time intervals.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced processing and more efficient utilization of communication resources. Specifically, a UE 115 may report results of LBT performed for one or more TTIs in a shared radio frequency spectrum, and a base station 105 may use the LBT results to improve scheduling. As a result, the base station 105 may be able to schedule the UE 115 for sidelink transmissions to maximize the use of resources in the shared radio frequency spectrum and minimize time and processing power used by the UE 115 to perform LBT.

Figure 9:
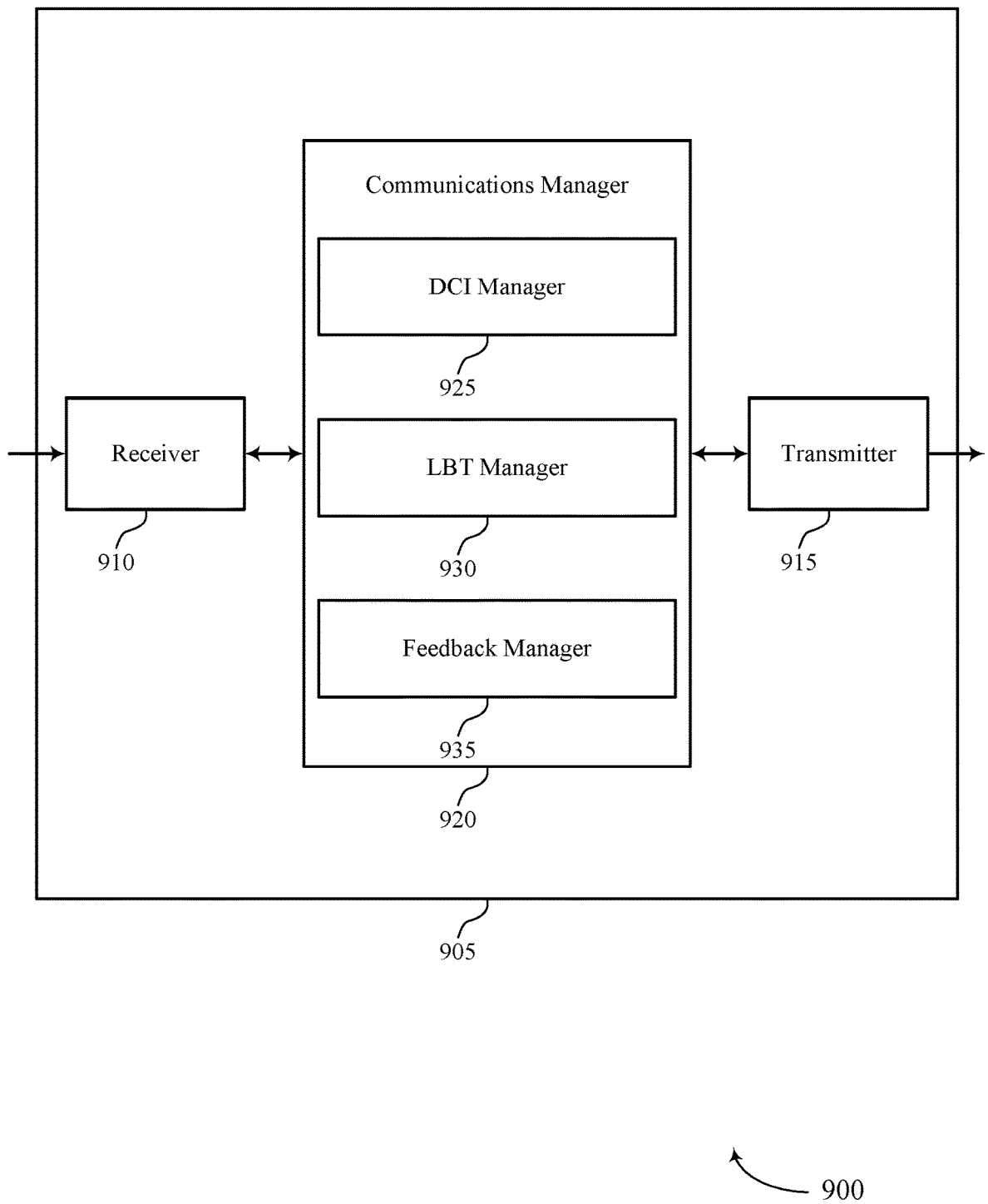

FIG. 9 shows a block diagram 900 of a device 905 that supports techniques for LBT failure reporting for multiple TTIs in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for LBT failure reporting for multiple TTIs). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for LBT failure reporting for multiple TTIs). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for LBT failure reporting for multiple TTIs as described herein. For example, the communications manager 920 may include a DCI manager 925, an LBT manager 930, a feedback manager 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a first UE in accordance with examples as disclosed herein. The DCI manager 925 may be configured as or otherwise support a means for receiving, from a base station, downlink control information scheduling sidelink transmissions, from the first UE to a second UE, in one or more sets of multiple transmission time intervals over a shared radio frequency spectrum. The LBT manager 930 may be configured as or otherwise support a means for performing listen-before-talk for one or more transmission time intervals in the one or more sets of multiple transmission time intervals. The feedback manager 935 may be configured as or otherwise support a means for transmitting, to the base station in an uplink control channel allocated for acknowledgment or negative acknowledgment feedback for the sidelink transmissions, an indication of results of the listen-before-talk performed for the one or more transmission time intervals.

Figure 10:
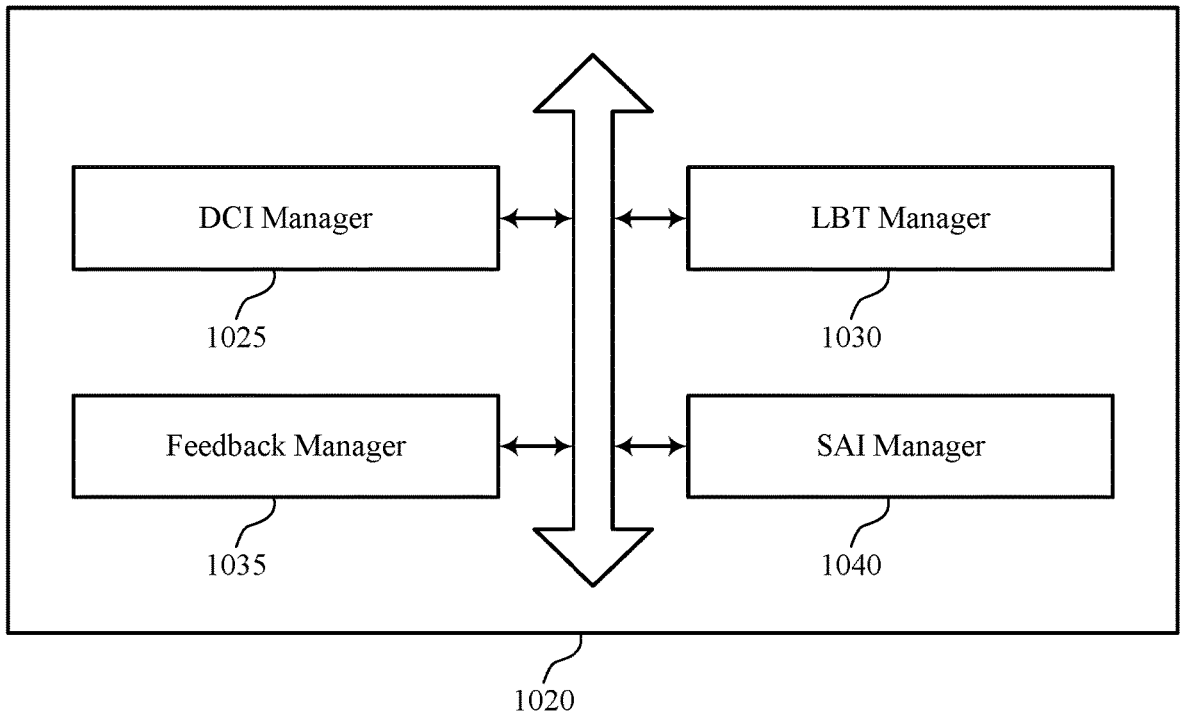
FIG. 10 shows a block diagram of a communications manager that supports techniques for LBT failure reporting for multiple TTIs in accordance with aspects of the present disclosure.

FIG. 10 shows a block diagram 1000 of a communications manager 1020 that supports techniques for LBT failure reporting for multiple TTIs in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for LBT failure reporting for multiple TTIs as described herein. For example, the communications manager 1020 may include a DCI manager 1025, an LBT manager 1030, a feedback manager 1035, an SAI manager 1040, or any combination thereof. Each of these components may communicate, directly or indirectly, with one another (e.g., via one or more buses).

The communications manager 1020 may support wireless communication at a first UE in accordance with examples as disclosed herein. The DCI manager 1025 may be configured as or otherwise support a means for receiving, from a base station, downlink control information scheduling sidelink transmissions, from the first UE to a second UE, in one or more sets of multiple transmission time intervals over a shared radio frequency spectrum. The LBT manager 1030 may be configured as or otherwise support a means for performing listen-before-talk for one or more transmission time intervals in the one or more sets of multiple transmission time intervals. The feedback manager 1035 may be configured as or otherwise support a means for transmitting, to the base station in an uplink control channel allocated for acknowledgment or negative acknowledgment feedback for the sidelink transmissions, an indication of results of the listen-before-talk performed for the one or more transmission time intervals.

In some examples, to support transmitting, the feedback manager 1035 may be configured as or otherwise support a means for transmitting, for each transmission time interval in the one or more sets, two bits indicating an acknowledgment or negative acknowledgment for the transmission time interval and an outcome of the listen-before-talk for the transmission time interval.

In some examples, a first bit of the two bits indicates the acknowledgment or the negative acknowledgment, and a second bit of the two bits indicates the outcome of the listen-before-talk.

In some examples, the two bits jointly indicate one of three states corresponding to a successful listen-before-talk and an acknowledgment, a successful listen-before-talk and a negative acknowledgment, and an unsuccessful listen-before-talk.

In some examples, to support transmitting, the feedback manager 1035 may be configured as or otherwise support a means for transmitting, for each set of the one or more sets, an indication of transmission time intervals in the set in which the listen-before-talk is successful.

In some examples, the indication of transmission time intervals in the set in which the listen-before-talk is successful includes an index of a transmission time interval in the set in which the listen-before-talk is successful.

In some examples, the index of the transmission time interval in the set in which the listen-before-talk is successful is relative to an index of a first transmission time interval in the set.

In some examples, a quantity of bits used for the indication of transmission time intervals in the set in which the listen-before-talk is successful is based on a number of transmission time intervals in the set.

In some examples, to support transmitting, the feedback manager 1035 may be configured as or otherwise support a means for transmitting an indication of a quantity of transmission time intervals in the one or more sets in which the listen-before-talk is successful.

In some examples, a quantity of bits used for the indication of the quantity of transmission time intervals in the one or more sets in which the listen-before-talk is successful is based on a quantity of transmission time intervals in the one or more sets.

In some examples, the SAI manager 1040 may be configured as or otherwise support a means for receiving, in the downlink control information, a sidelink assignment indicator indicating an accumulative quantity of transmission time intervals in which the first UE is scheduled to transmit sidelink transmissions.

In some examples, a quantity of bits used for the sidelink assignment indicator is based on a maximum number of transmission time intervals supported by the downlink control information.

In some examples, the DCI manager 1025 may be configured as or otherwise support a means for detecting that the first UE failed to receive previous downlink control information scheduling previous sidelink transmissions from the first UE based on the sidelink assignment indicator. In some examples, the feedback manager 1035 may be configured as or otherwise support a means for transmitting, in the uplink control channel, a negative acknowledgment and an indication of an unsuccessful listen-before-talk for each of the previous sidelink transmissions based on the detecting.

In some examples, the SAI manager 1040 may be configured as or otherwise support a means for receiving, in the downlink control information in addition to the sidelink assignment indicator, a listen-before-talk sidelink assignment indicator indicating an accumulative quantity of listen-before-talk outcome bits to be transmitted by the first UE to the base station.

In some examples, the DCI manager 1025 may be configured as or otherwise support a means for detecting that the first UE failed to receive previous downlink control information scheduling previous sidelink transmissions from the first UE based on the sidelink assignment indicator and that the first UE failed to transmit listen-before-talk outcome bits for the previous sidelink transmissions based on the listen-before-talk sidelink assignment indicator. In some examples, the feedback manager 1035 may be configured as or otherwise support a means for transmitting, in the uplink control channel, a negative acknowledgment for each of the previous sidelink transmissions and listen-before-talk outcome bits set to one for the previous sidelink transmissions indicating an unsuccessful listen-before-talk for each of the previous sidelink transmissions based on the detecting.

In some examples, the SAI manager 1040 may be configured as or otherwise support a means for receiving, in the downlink control information, a sidelink assignment indicator indicating a first accumulative quantity of transmission time intervals in which the first UE is scheduled to transmit sidelink transmissions plus a second accumulative quantity of listen-before-talk outcome bits to be transmitted by the first UE to the base station.

In some examples, the DCI manager 1025 may be configured as or otherwise support a means for detecting that the first UE failed to receive previous downlink control information scheduling previous sidelink transmissions from the first UE and failed to transmit listen-before-talk outcome bits for the previous sidelink transmissions based on the sidelink assignment indicator. In some examples, the feedback manager 1035 may be configured as or otherwise support a means for transmitting, in the uplink control channel, a negative acknowledgment for each of the previous sidelink transmissions and listen-before-talk outcome bits set to one for the previous sidelink transmissions indicating an unsuccessful listen-before-talk for each of the previous sidelink transmissions based on the detecting.

Figure 11:
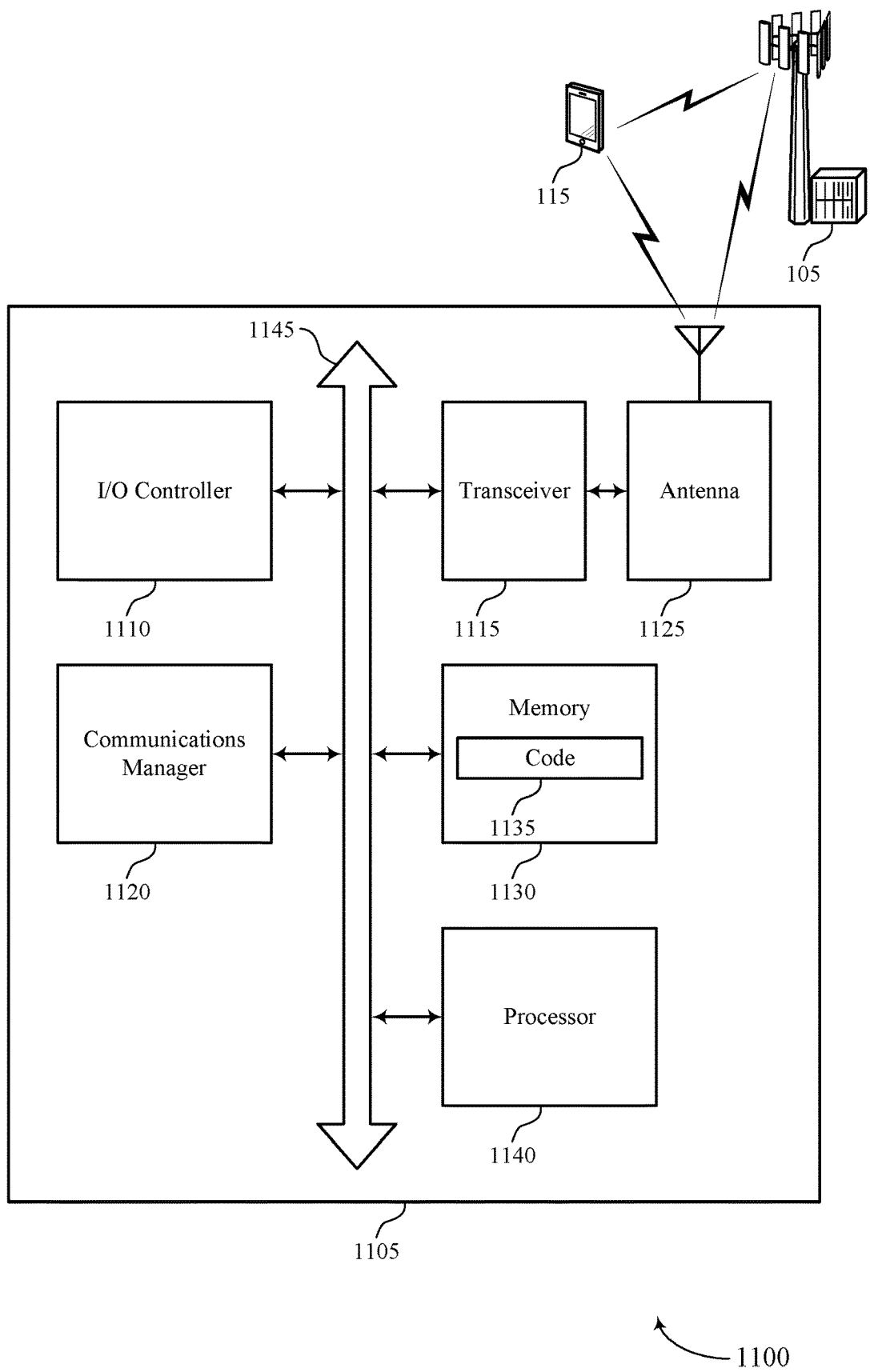
FIG. 11 shows a diagram of a system including a device that supports techniques for LBT failure reporting for multiple TTIs in accordance with aspects of the present disclosure.

FIG. 11 shows a diagram of a system 1100 including a device 1105 that supports techniques for LBT failure reporting for multiple TTIs in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for LBT failure reporting for multiple TTIs). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at a first UE in accordance with examples as disclosed herein. For example, the communications manager 1120 may be configured as or otherwise support a means for receiving, from a base station, downlink control information scheduling sidelink transmissions, from the first UE to a second UE, in one or more sets of multiple transmission time intervals over a shared radio frequency spectrum. The communications manager 1120 may be configured as or otherwise support a means for performing listen-before-talk for one or more transmission time intervals in the one or more sets of multiple transmission time intervals. The communications manager 1120 may be configured as or otherwise support a means for transmitting, to the base station in an uplink control channel allocated for acknowledgment or negative acknowledgment feedback for the sidelink transmissions, an indication of results of the listen-before-talk performed for the one or more transmission time intervals.

By including or configuring the communications manager 1120 in accordance with examples as described herein, the device 1105 may support techniques for reduced processing and more efficient utilization of communication resources. Specifically, a UE 115 may report results of LBT performed for one or more TTIs in a shared radio frequency spectrum, and a base station 105 may use the LBT results to improve scheduling. As a result, the base station 105 may be able to schedule the UE 115 for sidelink transmissions to maximize the use of resources in the shared radio frequency spectrum and minimize time and processing power used by the UE 115 to perform LBT.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for LBT failure reporting for multiple TTIs as described herein, or the processor 1140 and the memory 1130 may be otherwise configured to perform or support such operations.

Figure 12:
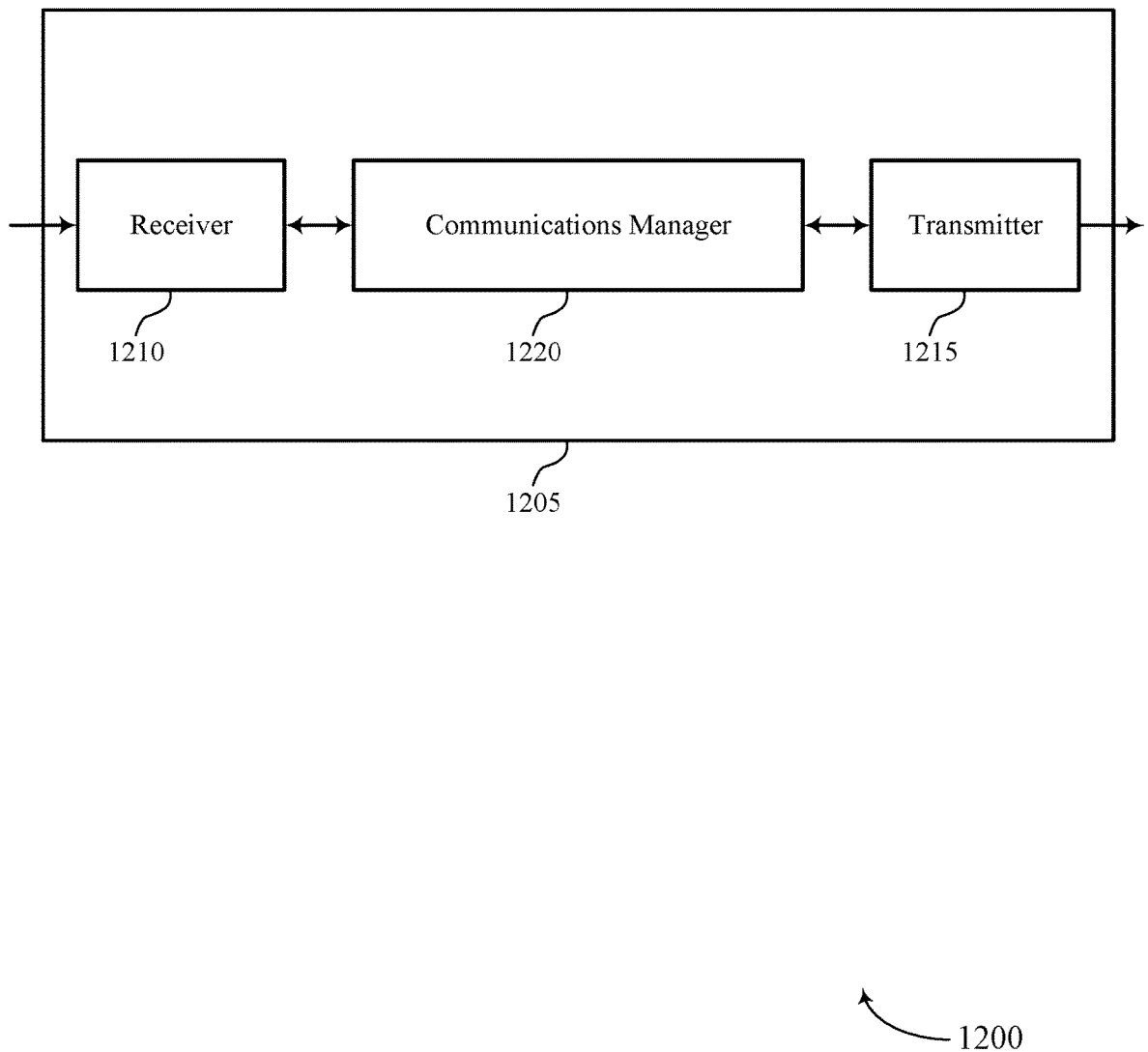
FIGS. 12 and 13 show block diagrams of devices that support techniques for LBT failure reporting for multiple TTIs in accordance with aspects of the present disclosure.

FIG. 12 shows a block diagram 1200 of a device 1205 that supports techniques for LBT failure reporting for multiple TTIs in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for LBT failure reporting for multiple TTIs). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for LBT failure reporting for multiple TTIs). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of techniques for LBT failure reporting for multiple TTIs as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. For example, the communications manager 1220 may be configured as or otherwise support a means for transmitting, to a first UE, downlink control information scheduling sidelink transmissions, from the first UE to a second UE, in one or more sets of multiple transmission time intervals over a shared radio frequency spectrum. The communications manager 1220 may be configured as or otherwise support a means for receiving, from the first UE in an uplink control channel allocated for acknowledgment or negative acknowledgment feedback for the sidelink transmissions, an indication of results of listen-before-talk performed by the first UE for one or more transmission time intervals in the one or more sets of multiple transmission time intervals. The communications manager 1220 may be configured as or otherwise support a means for scheduling subsequent sidelink transmissions from the first UE based on the results of the listen-before-talk.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for reduced processing and more efficient utilization of communication resources. Specifically, a UE 115 may report results of LBT performed for one or more TTIs in a shared radio frequency spectrum, and a base station 105 may use the LBT results to improve scheduling. As a result, the base station 105 may be able to schedule the UE 115 for sidelink transmissions to maximize the use of resources in the shared radio frequency spectrum and minimize time and processing power used by the UE 115 to perform LBT.

Figure 13:
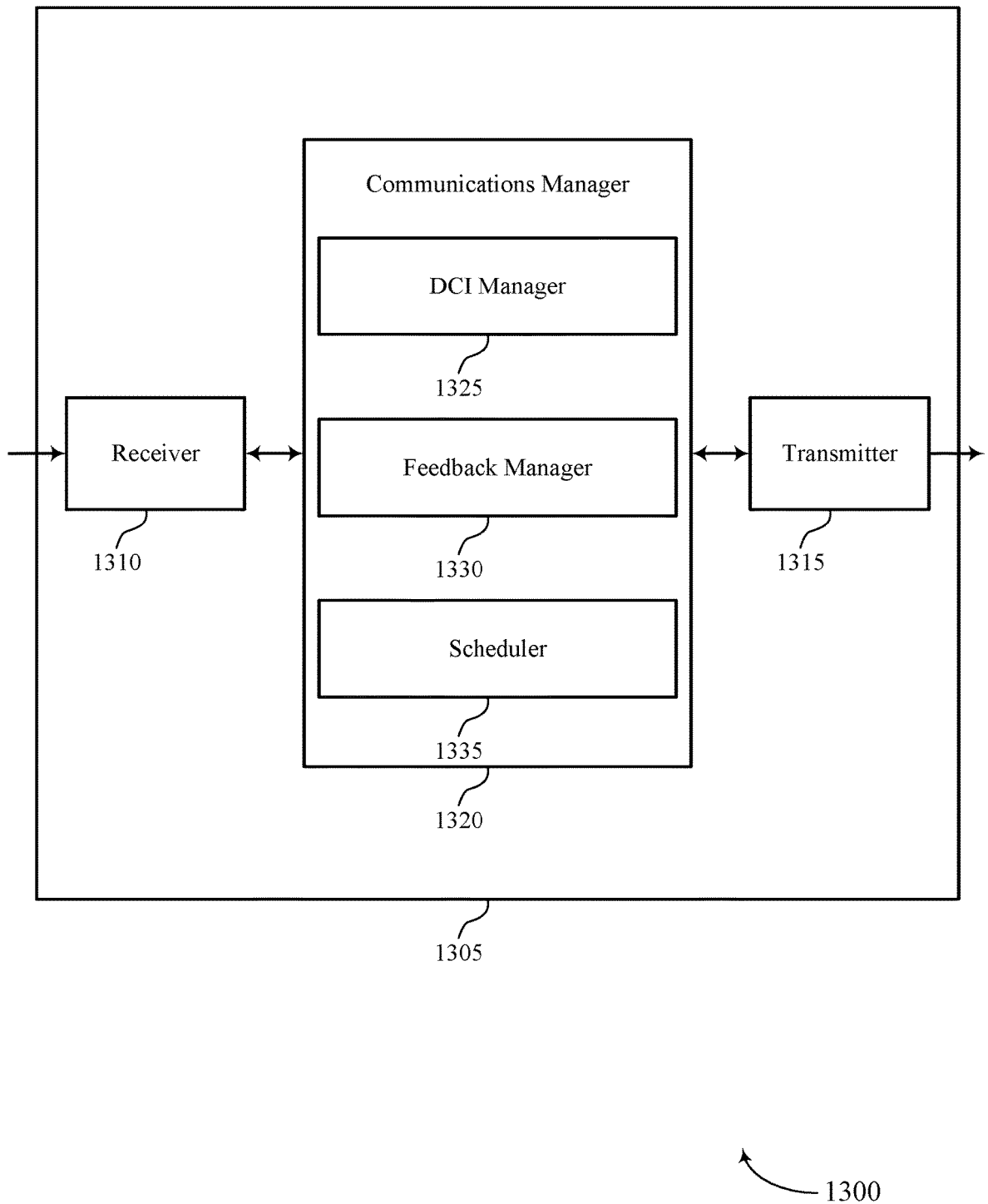

FIG. 13 shows a block diagram 1300 of a device 1305 that supports techniques for LBT failure reporting for multiple TTIs in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to techniques for LBT failure reporting for multiple TTIs). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to techniques for LBT failure reporting for multiple TTIs). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of techniques for LBT failure reporting for multiple TTIs as described herein. For example, the communications manager 1320 may include a DCI manager 1325, a feedback manager 1330, a scheduler 1335, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a base station in accordance with examples as disclosed herein. The DCI manager 1325 may be configured as or otherwise support a means for transmitting, to a first UE, downlink control information scheduling sidelink transmissions, from the first UE to a second UE, in one or more sets of multiple transmission time intervals over a shared radio frequency spectrum. The feedback manager 1330 may be configured as or otherwise support a means for receiving, from the first UE in an uplink control channel allocated for acknowledgment or negative acknowledgment feedback for the sidelink transmissions, an indication of results of listen-before-talk performed by the first UE for one or more transmission time intervals in the one or more sets of multiple transmission time intervals. The scheduler 1335 may be configured as or otherwise support a means for scheduling subsequent sidelink transmissions from the first UE based on the results of the listen-before-talk.

Figure 14:
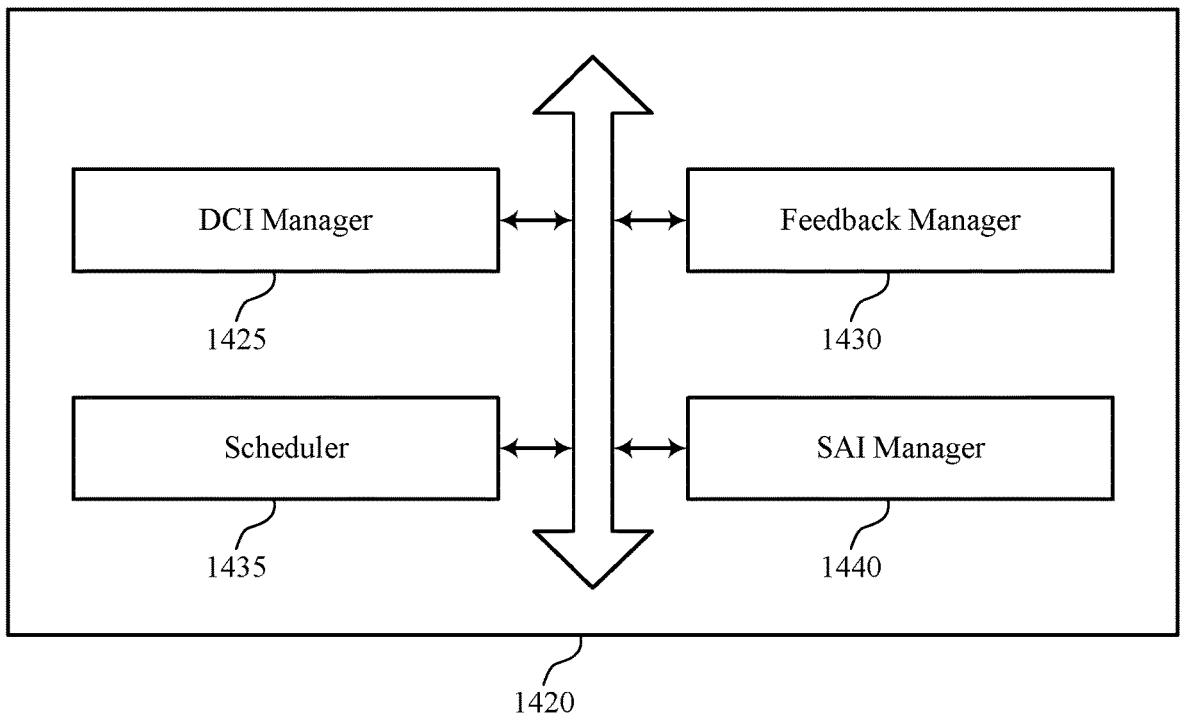
FIG. 14 shows a block diagram of a communications manager that supports techniques for LBT failure reporting for multiple TTIs in accordance with aspects of the present disclosure.

FIG. 14 shows a block diagram 1400 of a communications manager 1420 that supports techniques for LBT failure reporting for multiple TTIs in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of techniques for LBT failure reporting for multiple TTIs as described herein. For example, the communications manager 1420 may include a DCI manager 1425, a feedback manager 1430, a scheduler 1435, an SAI manager 1440, or any combination thereof. Each of these components may communicate, directly or indirectly, with one another (e.g., via one or more buses).

The communications manager 1420 may support wireless communication at a base station in accordance with examples as disclosed herein. The DCI manager 1425 may be configured as or otherwise support a means for transmitting, to a first UE, downlink control information scheduling sidelink transmissions, from the first UE to a second UE, in one or more sets of multiple transmission time intervals over a shared radio frequency spectrum. The feedback manager 1430 may be configured as or otherwise support a means for receiving, from the first UE in an uplink control channel allocated for acknowledgment or negative acknowledgment feedback for the sidelink transmissions, an indication of results of listen-before-talk performed by the first UE for one or more transmission time intervals in the one or more sets of multiple transmission time intervals. The scheduler 1435 may be configured as or otherwise support a means for scheduling subsequent sidelink transmissions from the first UE based on the results of the listen-before-talk.

In some examples, to support receiving, the feedback manager 1430 may be configured as or otherwise support a means for receiving, for each transmission time interval in the one or more sets, two bits indicating an acknowledgment or negative acknowledgment for the transmission time interval and an outcome of the listen-before-talk for the transmission time interval.

In some examples, a first bit of the two bits indicates the acknowledgment or the negative acknowledgment, and a second bit of the two bits indicates the outcome of the listen-before-talk.

In some examples, the two bits jointly indicate one of three states corresponding to a successful listen-before-talk and an acknowledgment, a successful listen-before-talk and a negative acknowledgment, and an unsuccessful listen-before-talk.

In some examples, to support receiving, the feedback manager 1430 may be configured as or otherwise support a means for receiving, for each set of the one or more sets, an indication of transmission time intervals in the set in which the listen-before-talk is successful.

In some examples, the indication of transmission time intervals in the set in which the listen-before-talk is successful includes an index of a transmission time interval in the set in which the listen-before-talk is successful.

In some examples, the index of the transmission time interval in the set in which the listen-before-talk is successful is relative to an index of a first transmission time interval in the set.

In some examples, a quantity of bits used for the indication of transmission time intervals in the set in which the listen-before-talk is successful is based on a number of transmission time intervals in the set.

In some examples, to support receiving, the feedback manager 1430 may be configured as or otherwise support a means for receiving an indication of a quantity of transmission time intervals in the one or more sets in which the listen-before-talk is successful.

In some examples, a quantity of bits used for the indication of the quantity of transmission time intervals in the one or more sets in which the listen-before-talk is successful is based on a quantity of transmission time intervals in the one or more sets.

In some examples, the SAI manager 1440 may be configured as or otherwise support a means for transmitting, in the downlink control information, a sidelink assignment indicator indicating an accumulative quantity of transmission time intervals in which the first UE is scheduled to transmit sidelink transmissions.

In some examples, a quantity of bits used for the sidelink assignment indicator is based on a maximum number of transmission time intervals supported by the downlink control information.

In some examples, the feedback manager 1430 may be configured as or otherwise support a means for receiving, in the uplink control channel, a negative acknowledgment and an indication of an unsuccessful listen-before-talk for each sidelink transmission of a set of previous sidelink transmissions scheduled by previous downlink control information from the base station based on the first UE failing to receive the previous downlink control information and based on transmitting the sidelink assignment indicator.

In some examples, the SAI manager 1440 may be configured as or otherwise support a means for transmitting, in the downlink control information in addition to the sidelink assignment indicator, a listen-before-talk sidelink assignment indicator indicating an accumulative quantity of listen-before-talk outcome bits to be transmitted by the first UE to the base station.

In some examples, the feedback manager 1430 may be configured as or otherwise support a means for receiving, in the uplink control channel, a negative acknowledgment for each sidelink transmission of a set of previous sidelink transmissions scheduled by previous downlink control information from the base station based on the first UE failing to receive the previous downlink control information and based on transmitting the sidelink assignment indicator. In some examples, the feedback manager 1430 may be configured as or otherwise support a means for receiving, in the uplink control channel, listen-before-talk outcome bits set to one for the previous sidelink transmissions indicating an unsuccessful listen-before-talk for each of the previous sidelink transmissions based on transmitting the listen-before-talk sidelink assignment indicator.

In some examples, the SAI manager 1440 may be configured as or otherwise support a means for transmitting, in the downlink control information, a sidelink assignment indicator indicating a first accumulative quantity of transmission time intervals in which the first UE is scheduled to transmit sidelink transmissions plus a second accumulative quantity of listen-before-talk outcome bits to be transmitted by the first UE to the base station.

In some examples, the feedback manager 1430 may be configured as or otherwise support a means for receiving, in the uplink control channel, a negative acknowledgment for each sidelink transmission of a set of previous sidelink transmissions scheduled by previous downlink control information from the base station based on the first UE failing to receive the previous downlink control information and based on transmitting the sidelink assignment indicator. In some examples, the feedback manager 1430 may be configured as or otherwise support a means for receiving, in the uplink control channel, listen-before-talk outcome bits set to one for the previous sidelink transmissions indicating an unsuccessful listen-before-talk for each of the previous sidelink transmissions based on transmitting the sidelink assignment indicator.

Figure 15:
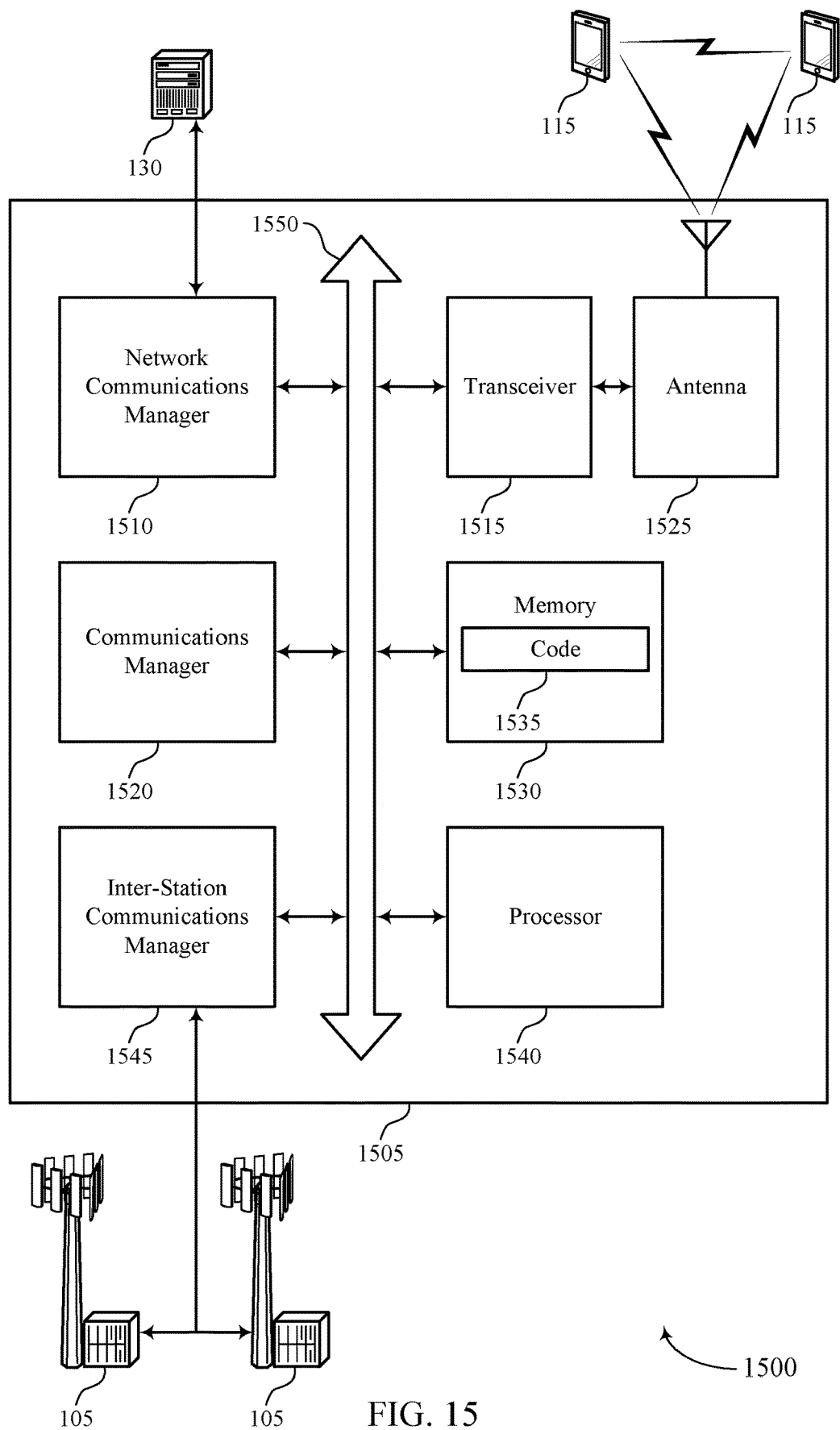
FIG. 15 shows a diagram of a system including a device that supports techniques for LBT failure reporting for multiple TTIs in accordance with aspects of the present disclosure.

FIG. 15 shows a diagram of a system 1500 including a device 1505 that supports techniques for LBT failure reporting for multiple TTIs in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting techniques for LBT failure reporting for multiple TTIs). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communication at a base station in accordance with examples as disclosed herein. For example, the communications manager 1520 may be configured as or otherwise support a means for transmitting, to a first UE, downlink control information scheduling sidelink transmissions, from the first UE to a second UE, in one or more sets of multiple transmission time intervals over a shared radio frequency spectrum. The communications manager 1520 may be configured as or otherwise support a means for receiving, from the first UE in an uplink control channel allocated for acknowledgment or negative acknowledgment feedback for the sidelink transmissions, an indication of results of listen-before-talk performed by the first UE for one or more transmission time intervals in the one or more sets of multiple transmission time intervals. The communications manager 1520 may be configured as or otherwise support a means for scheduling subsequent sidelink transmissions from the first UE based on the results of the listen-before-talk.

By including or configuring the communications manager 1520 in accordance with examples as described herein, the device 1505 may support techniques for reduced processing and more efficient utilization of communication resources. Specifically, a UE 115 may report results of LBT performed for one or more TTIs in a shared radio frequency spectrum, and a base station 105 may use the LBT results to improve scheduling. As a result, the base station 105 may be able to schedule the UE 115 for sidelink transmissions to maximize the use of resources in the shared radio frequency spectrum and minimize time and processing power used by the UE 115 to perform LBT.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of techniques for LBT failure reporting for multiple TTIs as described herein, or the processor 1540 and the memory 1530 may be otherwise configured to perform or support such operations.

Figure 16:
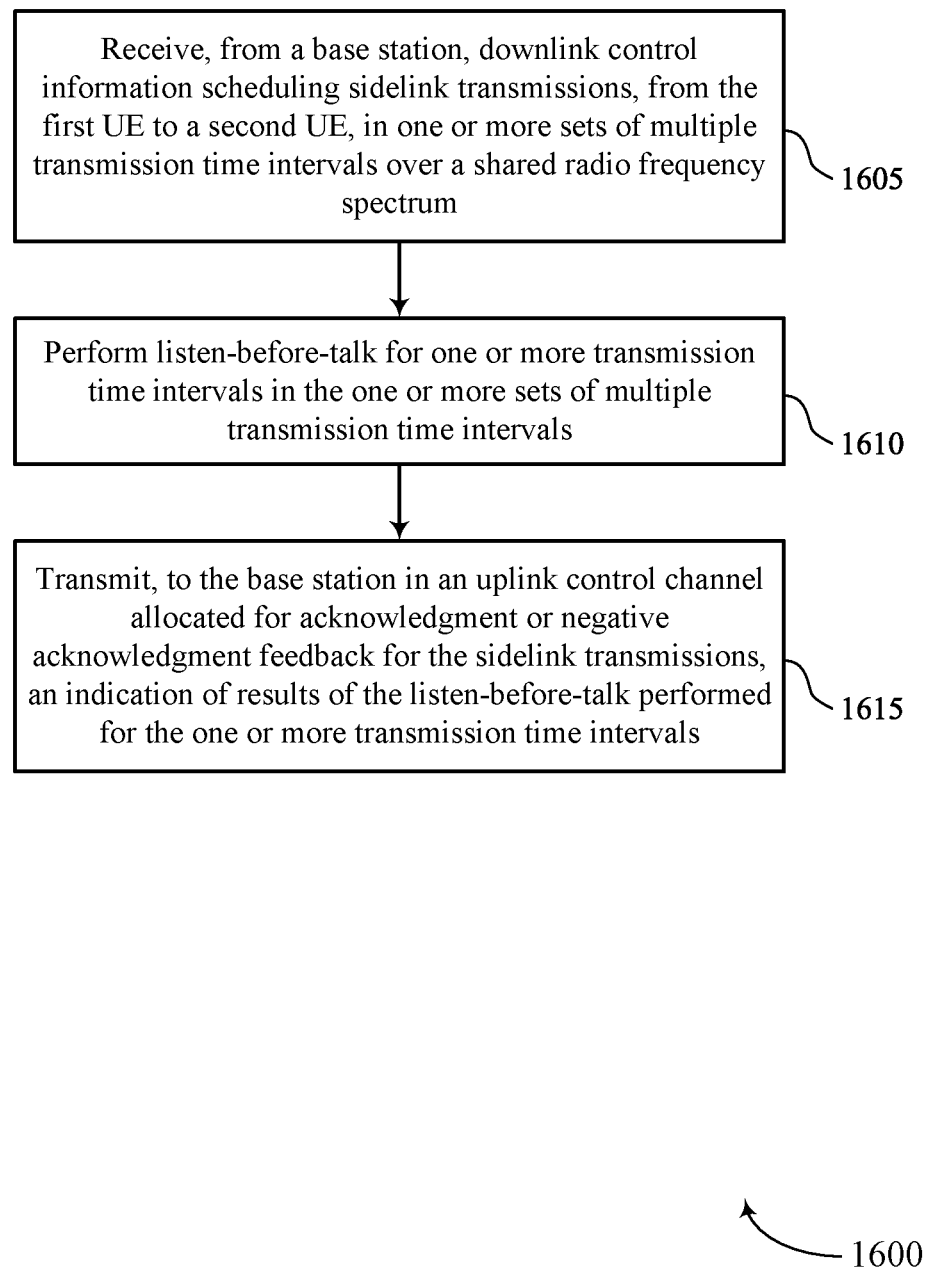
FIGS. 16 and 17 show flowcharts illustrating methods that support techniques for LBT failure reporting for multiple TTIs in accordance with aspects of the present disclosure.

FIG. 16 shows a flowchart illustrating a method 1600 that supports techniques for LBT failure reporting for multiple TTIs in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving, from a base station, downlink control information scheduling sidelink transmissions, from the first UE to a second UE, in one or more sets of multiple transmission time intervals over a shared radio frequency spectrum. The operations of 1605 may be performed in accordance with examples as disclosed herein. In some examples, aspects of the operations of 1605 may be performed by a DCI manager 1025 as described with reference to FIG. 10.

At 1610, the method may include performing listen-before-talk for one or more transmission time intervals in the one or more sets of multiple transmission time intervals. The operations of 1610 may be performed in accordance with examples as disclosed herein. In some examples, aspects of the operations of 1610 may be performed by an LBT manager 1030 as described with reference to FIG. 10.

At 1615, the method may include transmitting, to the base station in an uplink control channel allocated for acknowledgment or negative acknowledgment feedback for the sidelink transmissions, an indication of results of the listen-before-talk performed for the one or more transmission time intervals. The operations of 1615 may be performed in accordance with examples as disclosed herein. In some examples, aspects of the operations of 1615 may be performed by a feedback manager 1035 as described with reference to FIG. 10.

Figure 17:
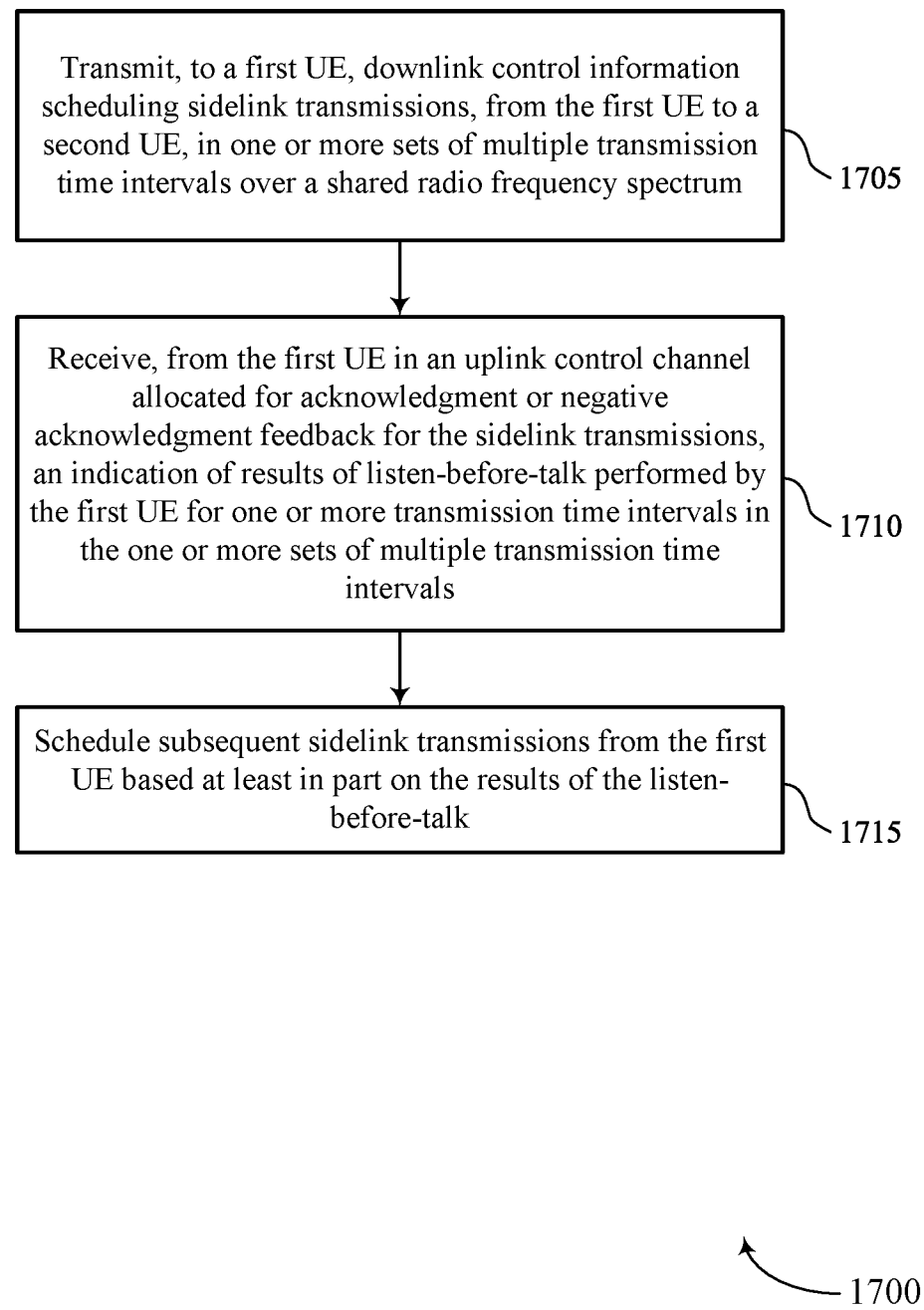

FIG. 17 shows a flowchart illustrating a method 1700 that supports techniques for LBT failure reporting for multiple TTIs in accordance with aspects of the present disclosure. The operations of the method 1700 may be implemented by a base station or its components as described herein. For example, the operations of the method 1700 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 1705, the method may include transmitting, to a first UE, downlink control information scheduling sidelink transmissions, from the first UE to a second UE, in one or more sets of multiple transmission time intervals over a shared radio frequency spectrum. The operations of 1705 may be performed in accordance with examples as disclosed herein. In some examples, aspects of the operations of 1705 may be performed by a DCI manager 1425 as described with reference to FIG. 14.

At 1710, the method may include receiving, from the first UE in an uplink control channel allocated for acknowledgment or negative acknowledgment feedback for the sidelink transmissions, an indication of results of listen-before-talk performed by the first UE for one or more transmission time intervals in the one or more sets of multiple transmission time intervals. The operations of 1710 may be performed in accordance with examples as disclosed herein. In some examples, aspects of the operations of 1710 may be performed by a feedback manager 1430 as described with reference to FIG. 14.

At 1715, the method may include scheduling subsequent sidelink transmissions from the first UE based on the results of the listen-before-talk. The operations of 1715 may be performed in accordance with examples as disclosed herein. In some examples, aspects of the operations of 1715 may be performed by a scheduler 1435 as described with reference to FIG. 14.

The following provides an overview of aspects of the present disclosure:

Aspect 1: A method for wireless communication at a first UE, comprising: receiving, from a base station, downlink control information scheduling sidelink transmissions, from the first UE to a second UE, in one or more sets of multiple transmission time intervals over a shared radio frequency spectrum; performing listen-before-talk for one or more transmission time intervals in the one or more sets of multiple transmission time intervals; and transmitting, to the base station in an uplink control channel allocated for acknowledgment or negative acknowledgment feedback for the sidelink transmissions, an indication of results of the listen-before-talk performed for the one or more transmission time intervals.

Aspect 2: The method of aspect 1, wherein the transmitting comprises: transmitting, for each transmission time interval in the one or more sets, two bits indicating an acknowledgment or negative acknowledgment for the transmission time interval and an outcome of the listen-before-talk for the transmission time interval.

Aspect 3: The method of aspect 2, wherein a first bit of the two bits indicates the acknowledgment or the negative acknowledgment, and a second bit of the two bits indicates the outcome of the listen-before-talk.

Aspect 4: The method of any of aspects 2 through 3, wherein the two bits jointly indicate one of three states corresponding to a successful listen-before-talk and an acknowledgment, a successful listen-before-talk and a negative acknowledgment, and an unsuccessful listen-before-talk.

Aspect 5: The method of any of aspects 1 through 4, wherein the transmitting comprises: transmitting, for each set of the one or more sets, an indication of transmission time intervals in the set in which the listen-before-talk is successful.

Aspect 6: The method of aspect 5, wherein the indication of transmission time intervals in the set in which the listen-before-talk is successful comprises an index of a transmission time interval in the set in which the listen-before-talk is successful.

Aspect 7: The method of aspect 6, wherein the index of the transmission time interval in the set in which the listen-before-talk is successful is relative to an index of a first transmission time interval in the set.

Aspect 8: The method of any of aspects 5 through 7, wherein a quantity of bits used for the indication of transmission time intervals in the set in which the listen-before-talk is successful is based at least in part on a number of transmission time intervals in the set.

Aspect 9: The method of any of aspects 1 through 8, wherein the transmitting comprises: transmitting an indication of a quantity of transmission time intervals in the one or more sets in which the listen-before-talk is successful.

Aspect 10: The method of aspect 9, wherein a quantity of bits used for the indication of the quantity of transmission time intervals in the one or more sets in which the listen-before-talk is successful is based at least in part on a quantity of transmission time intervals in the one or more sets.

Aspect 11: The method of any of aspects 1 through 10, further comprising: receiving, in the downlink control information, a sidelink assignment indicator indicating an accumulative quantity of transmission time intervals in which the first UE is scheduled to transmit sidelink transmissions.

Aspect 12: The method of aspect 11, wherein a quantity of bits used for the sidelink assignment indicator is based at least in part on a maximum number of transmission time intervals supported by the downlink control information.

Aspect 13: The method of any of aspects 11 through 12, further comprising: detecting that the first UE failed to receive previous downlink control information scheduling previous sidelink transmissions from the first UE based at least in part on the sidelink assignment indicator; and transmitting, in the uplink control channel, a negative acknowledgment and an indication of an unsuccessful listen-before-talk for each of the previous sidelink transmissions based at least in part on the detecting.

Aspect 14: The method of any of aspects 11 through 13, further comprising: receiving, in the downlink control information in addition to the sidelink assignment indicator, a listen-before-talk sidelink assignment indicator indicating an accumulative quantity of listen-before-talk outcome bits to be transmitted by the first UE to the base station.

Aspect 15: The method of aspect 14, further comprising: detecting that the first UE failed to receive previous downlink control information scheduling previous sidelink transmissions from the first UE based at least in part on the sidelink assignment indicator and that the first UE failed to transmit listen-before-talk outcome bits for the previous sidelink transmissions based at least in part on the listen-before-talk sidelink assignment indicator; and transmitting, in the uplink control channel, a negative acknowledgment for each of the previous sidelink transmissions and listen-before-talk outcome bits set to one for the previous sidelink transmissions indicating an unsuccessful listen-before-talk for each of the previous sidelink transmissions based at least in part on the detecting.

Aspect 16: The method of any of aspects 1 through 15, further comprising: receiving, in the downlink control information, a sidelink assignment indicator indicating a first accumulative quantity of transmission time intervals in which the first UE is scheduled to transmit sidelink transmissions plus a second accumulative quantity of listen-before-talk outcome bits to be transmitted by the first UE to the base station.

Aspect 17: The method of aspect 16, further comprising: detecting that the first UE failed to receive previous downlink control information scheduling previous sidelink transmissions from the first UE and failed to transmit listen-before-talk outcome bits for the previous sidelink transmissions based at least in part on the sidelink assignment indicator; and transmitting, in the uplink control channel, a negative acknowledgment for each of the previous sidelink transmissions and listen-before-talk outcome bits set to one for the previous sidelink transmissions indicating an unsuccessful listen-before-talk for each of the previous sidelink transmissions based at least in part on the detecting.

Aspect 18: A method for wireless communication at a base station, comprising: transmitting, to a first UE, downlink control information scheduling sidelink transmissions, from the first UE to a second UE, in one or more sets of multiple transmission time intervals over a shared radio frequency spectrum; receiving, from the first UE in an uplink control channel allocated for acknowledgment or negative acknowledgment feedback for the sidelink transmissions, an indication of results of listen-before-talk performed by the first UE for one or more transmission time intervals in the one or more sets of multiple transmission time intervals; and scheduling subsequent sidelink transmissions from the first UE based at least in part on the results of the listen-before-talk.

Aspect 19: The method of aspect 18, wherein the receiving comprises: receiving, for each transmission time interval in the one or more sets, two bits indicating an acknowledgment or negative acknowledgment for the transmission time interval and an outcome of the listen-before-talk for the transmission time interval.

Aspect 20: The method of aspect 19, wherein a first bit of the two bits indicates the acknowledgment or the negative acknowledgment, and a second bit of the two bits indicates the outcome of the listen-before-talk.

Aspect 21: The method of any of aspects 19 through 20, wherein the two bits jointly indicate one of three states corresponding to a successful listen-before-talk and an acknowledgment, a successful listen-before-talk and a negative acknowledgment, and an unsuccessful listen-before-talk.

Aspect 22: The method of any of aspects 18 through 21, wherein the receiving comprises: receiving, for each set of the one or more sets, an indication of transmission time intervals in the set in which the listen-before-talk is successful.

Aspect 23: The method of aspect 22, wherein the indication of transmission time intervals in the set in which the listen-before-talk is successful comprises an index of a transmission time interval in the set in which the listen-before-talk is successful.

Aspect 24: The method of aspect 23, wherein the index of the transmission time interval in the set in which the listen-before-talk is successful is relative to an index of a first transmission time interval in the set.

Aspect 25: The method of any of aspects 22 through 24, wherein a quantity of bits used for the indication of transmission time intervals in the set in which the listen-before-talk is successful is based at least in part on a number of transmission time intervals in the set.

Aspect 26: The method of any of aspects 18 through 25, wherein the receiving comprises: receiving an indication of a quantity of transmission time intervals in the one or more sets in which the listen-before-talk is successful.

Aspect 27: The method of aspect 26, wherein a quantity of bits used for the indication of the quantity of transmission time intervals in the one or more sets in which the listen-before-talk is successful is based at least in part on a quantity of transmission time intervals in the one or more sets.

Aspect 28: The method of any of aspects 18 through 27, further comprising: transmitting, in the downlink control information, a sidelink assignment indicator indicating an accumulative quantity of transmission time intervals in which the first UE is scheduled to transmit sidelink transmissions.

Aspect 29: The method of aspect 28, wherein a quantity of bits used for the sidelink assignment indicator is based at least in part on a maximum number of transmission time intervals supported by the downlink control information.

Aspect 30: The method of any of aspects 28 through 29, further comprising: receiving, in the uplink control channel, a negative acknowledgment and an indication of an unsuccessful listen-before-talk for each sidelink transmission of a set of previous sidelink transmissions scheduled by previous downlink control information from the base station based at least in part on the first UE failing to receive the previous downlink control information and based at least in part on transmitting the sidelink assignment indicator.

Aspect 31: The method of any of aspects 28 through 30, further comprising: transmitting, in the downlink control information in addition to the sidelink assignment indicator, a listen-before-talk sidelink assignment indicator indicating an accumulative quantity of listen-before-talk outcome bits to be transmitted by the first UE to the base station.

Aspect 32: The method of aspect 31, further comprising: receiving, in the uplink control channel, a negative acknowledgment for each sidelink transmission of a set of previous sidelink transmissions scheduled by previous downlink control information from the base station based at least in part on the first UE failing to receive the previous downlink control information and based at least in part on transmitting the sidelink assignment indicator; and receiving, in the uplink control channel, listen-before-talk outcome bits set to one for the previous sidelink transmissions indicating an unsuccessful listen-before-talk for each of the previous sidelink transmissions based at least in part on transmitting the listen-before-talk sidelink assignment indicator.

Aspect 33: The method of any of aspects 18 through 32, further comprising: transmitting, in the downlink control information, a sidelink assignment indicator indicating a first accumulative quantity of transmission time intervals in which the first UE is scheduled to transmit sidelink transmissions plus a second accumulative quantity of listen-before-talk outcome bits to be transmitted by the first UE to the base station.

Aspect 34: The method of aspect 33, further comprising: receiving, in the uplink control channel, a negative acknowledgment for each sidelink transmission of a set of previous sidelink transmissions scheduled by previous downlink control information from the base station based at least in part on the first UE failing to receive the previous downlink control information and based at least in part on transmitting the sidelink assignment indicator; and receiving, in the uplink control channel, listen-before-talk outcome bits set to one for the previous sidelink transmissions indicating an unsuccessful listen-before-talk for each of the previous sidelink transmissions based at least in part on transmitting the sidelink assignment indicator.

Aspect 35: An apparatus for wireless communication at a first UE, comprising a processor; memory coupled with the processor; and instructions stored in the memory and executable by the processor to cause the apparatus to perform a method of any of aspects 1 through 17.

Aspect 36: An apparatus for wireless communication at a first UE, comprising at least one means for performing a method of any of aspects 1 through 17.

Aspect 37: A non-transitory computer-readable medium storing code for wireless communication at a first UE, the code comprising instructions executable by a processor to perform a method of any of aspects 1 through 17.

Aspect 38: An apparatus for wireless communication at a base station, comprising a processor; memory coupled with the processor; and instructions stored in the memory and executable by the processor to cause the apparatus to perform a method of any of aspects 18 through 34.

Aspect 39: An apparatus for wireless communication at a base station, comprising at least one means for performing a method of any of aspects 18 through 34.

Aspect 40: A non-transitory computer-readable medium storing code for wireless communication at a base station, the code comprising instructions executable by a processor to perform a method of any of aspects 18 through 34.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:

receiving, from a network entity, downlink control information scheduling sidelink transmissions, from the first UE to a second UE, in one or more sets of multiple transmission time intervals over a shared radio frequency spectrum, wherein the downlink control information allocates a two-bit uplink control channel resource for acknowledgement or negative acknowledgement feedback for the sidelink transmissions, wherein the downlink control information includes a sidelink assignment indicator that indicates an accumulative quantity of transmission time intervals of the one or more sets of multiple transmission time intervals in which the first UE is scheduled to transmit the sidelink transmissions, and wherein a quantity of bits used for the sidelink assignment indicator is based at least in part on a maximum quantity of transmission time intervals supported by the downlink control information;

performing listen-before-talk for one or more transmission time intervals in the one or more sets of multiple transmission time intervals; and transmitting a joint indication to the network entity via the two-bit uplink control channel resource, the joint indication comprising both a first bit and a second bit of the two-bit uplink control channel resource, the first bit indicating an acknowledgement or negative acknowledgement for a respective sidelink transmission of the sidelink transmissions associated with a respective transmission time interval, and the second bit indicating results of the listen-before-talk performed for the respective transmission time interval, wherein the joint indication is transmitted for each respective transmission time interval in the one or more sets of multiple transmission time intervals, and wherein the acknowledgement or negative acknowledgement is based at least in part on the sidelink assignment indicator.

2. The method of claim 1, wherein the two-bit uplink control channel resource jointly indicates one of three states, the three states including a first state corresponding to a successful listen-before-talk and an acknowledgment, a second state corresponding to a successful listen-before-talk and a negative acknowledgment, and a third state corresponding to an unsuccessful listen-before-talk.

3. The method of claim 1, wherein the transmitting comprises:
transmitting, for each set of the one or more sets of multiple transmission time intervals, an indication of transmission time intervals in a set of multiple transmission time intervals in which the listen-before-talk is successful.

4. The method of claim 3, wherein the indication of the transmission time intervals in the set of multiple transmission time intervals in which the listen-before-talk is successful comprises an index of a transmission time interval in the set of multiple transmission time intervals in which the listen-before-talk is successful.

5. The method of claim 4, wherein the index of the transmission time interval in the set of multiple transmission time intervals in which the listen-before-talk is successful is relative to an index of a first transmission time interval in the set of multiple transmission time intervals.

6. The method of claim 3, wherein a quantity of bits used for the indication of the transmission time intervals in the set of multiple transmission time intervals in which the listen-before-talk is successful is based at least in part on a number of transmission time intervals in the set of multiple transmission time intervals.

7. The method of claim 1, wherein the transmitting comprises:
transmitting an indication of a quantity of transmission time intervals in the one or more sets of multiple transmission time intervals in which the listen-before-talk is successful.

8. The method of claim 7, wherein a quantity of bits used for the indication of the quantity of transmission time intervals in the one or more sets of multiple transmission time intervals in which the listen-before-talk is successful is based at least in part on a quantity of transmission time intervals in the one or more sets of multiple transmission time intervals.

9. The method of claim 1, further comprising:
detecting that the first UE failed to receive previous downlink control information scheduling previous sidelink transmissions from the first UE based at least in part on the sidelink assignment indicator; and
transmitting, via the two-bit uplink control channel resource, a negative acknowledgment and an indication of an unsuccessful listen-before-talk for each of the previous sidelink transmissions based at least in part on the detecting.

10. The method of claim 1, further comprising:
receiving, in the downlink control information in addition to the sidelink assignment indicator, a listen-before-talk sidelink assignment indicator indicating an accumulative quantity of listen-before-talk outcome bits to be transmitted by the first UE to the network entity.

11. The method of claim 10, further comprising:
detecting that the first UE failed to receive previous downlink control information scheduling previous sidelink transmissions from the first UE based at least in part on the sidelink assignment indicator and that the first UE failed to transmit the listen-before-talk outcome bits for the previous sidelink transmissions based at least in part on the listen-before-talk sidelink assignment indicator; and
transmitting, via the two-bit uplink control channel resource, a negative acknowledgment for each of the previous sidelink transmissions and the listen-before-talk outcome bits set to one for the previous sidelink transmissions indicating an unsuccessful listen-before-talk for each of the previous sidelink transmissions based at least in part on the detecting.

12. The method of claim 1, further comprising:
receiving, in the downlink control information, the sidelink assignment indicator indicating the accumulative quantity of transmission time intervals in which the first UE is scheduled to transmit sidelink transmissions plus a second accumulative quantity of listen-before-talk outcome bits to be transmitted by the first UE to the network entity.

13. The method of claim 12, further comprising:
detecting that the first UE failed to receive previous downlink control information scheduling previous sidelink transmissions from the first UE and failed to transmit listen-before-talk outcome bits for the previous sidelink transmissions based at least in part on the sidelink assignment indicator; and
transmitting, via the two-bit uplink control channel resource, a negative acknowledgment for each of the previous sidelink transmissions and the listen-before-talk outcome bits set to one for the previous sidelink transmissions indicating an unsuccessful listen-before-talk for each of the previous sidelink transmissions based at least in part on the detecting.

14. A method for wireless communication at a network entity, comprising:
transmitting, to a first user equipment (UE), downlink control information scheduling sidelink transmissions, from the first UE to a second UE, in one or more sets of multiple transmission time intervals over a shared radio frequency spectrum, wherein the downlink control information allocates a two-bit uplink control channel resource for acknowledgement or negative acknowledgement feedback for the sidelink transmissions, wherein the downlink control information includes a sidelink assignment indicator that indicates an accumulative quantity of transmission time intervals of the one or more sets of multiple transmission time intervals in which the first UE is scheduled to transmit the sidelink transmissions, and wherein a quantity of bits used for the sidelink assignment indicator is based at least in part on a maximum quantity of transmission time intervals supported by the downlink control information;
receiving a joint indication from the first UE via the two-bit uplink control channel resource, the joint indication comprising both a first bit and a second bit of the two-bit uplink control channel resource, the first bit indicating an acknowledgement or negative acknowledgement for a respective sidelink transmission of the sidelink transmissions associated with a respective transmission time interval in the one or more sets of multiple transmission time intervals, and the second bit indicating results of listen-before-talk performed by the first UE for the respective time interval, wherein the joint indication is received for each respective transmission time interval in the one or more sets of multiple transmission time intervals, and wherein the acknowledgement or negative acknowledgement is based at least in part on the sidelink assignment indicator; and scheduling subsequent sidelink transmissions from the first UE based at least in part on the results of the listen-before-talk for the one or more transmission time intervals.

15. The method of claim 14, wherein the two-bit uplink control channel resource jointly indicates one of three states, the three states including a first state corresponding to a successful listen-before-talk and an acknowledgment, a second state corresponding to a successful listen-before-talk and a negative acknowledgment, and a third state corresponding to an unsuccessful listen-before-talk.

16. The method of claim 14, wherein the receiving comprises:
receiving, for each set of the one or more sets of multiple transmission time intervals, an indication of transmission time intervals in a set of multiple transmission time intervals in which the listen-before-talk is successful.

17. The method of claim 16, wherein the indication of transmission time intervals in the set of multiple transmission time intervals in which the listen-before-talk is successful comprises an index of a transmission time interval in the set of multiple transmission time intervals in which the listen-before-talk is successful.

18. The method of claim 17, wherein the index of the transmission time interval in the set of multiple transmission time intervals in which the listen-before-talk is successful is relative to an index of a first transmission time interval in the set of multiple transmission time intervals.

19. The method of claim 14, wherein the receiving comprises:
receiving an indication of a quantity of transmission time intervals in the one or more sets of multiple transmission time intervals in which the listen-before-talk is successful.

20. The method of claim 14, further comprising:
transmitting, in the downlink control information in addition to the sidelink assignment indicator, a listen-before-talk sidelink assignment indicator indicating an accumulative quantity of listen-before-talk outcome bits to be transmitted by the first UE to the network entity.

21. The method of claim 14, further comprising:
transmitting, in the downlink control information, the sidelink assignment indicator indicating the accumulative quantity of transmission time intervals in which the first UE is scheduled to transmit sidelink transmissions plus a second accumulative quantity of listen-before-talk outcome bits to be transmitted by the first UE to the network entity.

22. An apparatus for wireless communication at a first user equipment (UE), comprising:
a processor;
memory coupled with the processor; and
instructions stored in the memory and executable by the processor to cause the apparatus to:
receive, from a network entity, downlink control information scheduling sidelink transmissions, from the first UE to a second UE, in one or more sets of multiple transmission time intervals over a shared radio frequency spectrum, wherein the downlink control information allocates a two-bit uplink control channel resource for an indication of acknowledgement or negative acknowledgement feedback for the sidelink transmissions, wherein the downlink control information includes a sidelink assignment indicator that indicates an accumulative quantity of transmission time intervals of the one or more sets of multiple transmission time intervals in which the first UE is scheduled to transmit the sidelink transmissions, and wherein a quantity of bits used for the sidelink assignment indicator is based at least in part on a maximum quantity of transmission time intervals supported by the downlink control information;
perform listen-before-talk for one or more transmission time intervals in the one or more sets of multiple transmission time intervals; and
transmit a joint indication to the network entity via the two-bit uplink control channel resource, the joint indication comprising both a first bit and a second bit of the two-bit uplink control channel resource, the first bit indicating an acknowledgement or negative acknowledgement for a respective sidelink transmission of the sidelink transmissions associated with a respective transmission time interval, and the second bit indicating results of the listen-before-talk performed for the respective transmission time interval, wherein the joint indication is transmitted for each respective transmission time interval in the one or more sets of multiple transmission time intervals, and wherein the acknowledgement or negative acknowledgement is based at least in part on the sidelink assignment indicator.

23. An apparatus for wireless communication at a network entity, comprising:
a processor;
memory coupled with the processor; and
instructions stored in the memory and executable by the processor to cause the apparatus to:
transmit, to a first user equipment (UE), downlink control information scheduling sidelink transmissions, from the first UE to a second UE, in one or more sets of multiple transmission time intervals over a shared radio frequency spectrum, wherein the downlink control information allocates a two-bit uplink control channel resource for acknowledgement or negative acknowledgement feedback for the sidelink transmissions, wherein the downlink control information includes a sidelink assignment indicator that indicates an accumulative quantity of transmission time intervals of the one or more sets of multiple transmission time intervals in which the first UE is scheduled to transmit the sidelink transmissions, and wherein a quantity of bits used for the sidelink assignment indicator is based at least in part on a maximum quantity of transmission time intervals supported by the downlink control information;
receive a joint indication from the first UE via the two-bit uplink control channel resource, the joint indication comprising both a first bit and a second bit of the two-bit uplink control channel resource, the first bit indicating an acknowledgement or negative acknowledgement for a respective sidelink transmission of the sidelink transmissions associated with a respective transmission time interval in the one or more sets of multiple transmission time intervals, and the second bit indicating results of listen-before-talk performed by the first UE for the respective time interval, wherein the joint indication is received for each respective transmission time interval in the one or more sets of multiple transmission time intervals, and wherein the acknowledgement or negative acknowledgement is based at least in part on the sidelink assignment indicator; and schedule subsequent sidelink transmissions from the first UE based at least in part on the results of the listen-before-talk for the one or more transmission time intervals.

* * * * *